US010951519B2

(12) United States Patent
Renzullo et al.

(10) Patent No.: US 10,951,519 B2
(45) Date of Patent: Mar. 16, 2021

(54) METHODS, SYSTEMS, AND COMPUTER READABLE MEDIA FOR MULTI-PROTOCOL STATEFUL ROUTING

(71) Applicant: Oracle International Corporation, Redwood Shores, CA (US)

(72) Inventors: Jared Michael Renzullo, Hudson, MA (US); Tarek Abou-Assali, Wellesley, MA (US); Sayan Chowdhury, Somerville, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/742,679

(22) Filed: Jun. 17, 2015

(65) Prior Publication Data
US 2016/0373348 A1 Dec. 22, 2016

(51) Int. Cl.
*G06F 15/16* (2006.01)
*H04L 12/781* (2013.01)
(Continued)

(52) U.S. Cl.
CPC ............ *H04L 45/52* (2013.01); *H04L 45/745* (2013.01); *H04L 47/20* (2013.01); *H04L 67/02* (2013.01); *H04L 69/08* (2013.01)

(58) Field of Classification Search
CPC ......... H04L 45/00; H04L 47/00; H04L 65/00; H04L 67/00; H04L 45/52; H04L 45/745; H04L 47/20; H04L 67/141
(Continued)

(56) References Cited

U.S. PATENT DOCUMENTS

| 1,872,857 A | 4/1931 | Wesson et al. |
| 5,878,347 A | 3/1999 | Joensuu et al. |

(Continued)

FOREIGN PATENT DOCUMENTS

| CN | 1809072 A | 7/2006 |
| CN | 101001440 A | 7/2007 |

(Continued)

OTHER PUBLICATIONS

H. Fathi, S. S. Chakraborty and R. Prasad, "On VoIP session setup delay using SIP over correlated fading channels," 2005 IEEE 16th International Symposium on Personal, Indoor and Mobile Radio Communications, Berlin, pp. 2211-2215, 2005 (Year: 2005).*

(Continued)

*Primary Examiner* — Melvin H Pollack
*Assistant Examiner* — Messeret F Gebre
(74) *Attorney, Agent, or Firm* — Jenkins, Wilson, Taylor & Hunt, P.A.

(57) ABSTRACT

Methods, systems, and computer readable media for multi-protocol stateful routing are provided. One method of routing is performed at a multi-protocol stateful router and includes receiving a first message of a client session that is communicated using a first protocol. The method includes obtaining, from the first message, one or more client identifiers, determining a policy server that is assigned to the client session, and storing the one or more client identifiers and a policy server identifier that is associated with the policy server assigned to the client session as a multi-protocol binding record. The method also includes receiving a second message that is communicated using a second protocol that is different from the first protocol, using the multi-protocol binding record to determine that the second message is in the client session, and route the second (Continued)

message to the policy server that is assigned to the client session.

13 Claims, 7 Drawing Sheets

(51) Int. Cl.
    *H04L 29/08*     (2006.01)
    *H04L 29/06*     (2006.01)
    *H04L 12/813*     (2013.01)
    *H04L 12/741*     (2013.01)

(58) Field of Classification Search
    USPC .................................................. 709/230, 228
    See application file for complete search history.

(56) References Cited

U.S. PATENT DOCUMENTS

| | | | |
|---|---|---|---|
| 6,008,098 | A | 12/1999 | Rathnasabapathy et al. |
| 6,298,383 | B1 | 10/2001 | Gutman et al. |
| 6,836,477 | B1 | 12/2004 | West, Jr. et al. |
| 6,967,956 | B1 | 11/2005 | Tinsley et al. |
| 7,292,592 | B2 | 11/2007 | Rune |
| 7,310,307 | B1 | 12/2007 | Das et al. |
| 7,319,857 | B2 | 1/2008 | Baldwin et al. |
| 7,551,926 | B2 | 6/2009 | Rune |
| 7,738,488 | B2 | 6/2010 | Marsico et al. |
| 7,792,981 | B2 | 9/2010 | Taylor |
| 7,814,015 | B2 | 10/2010 | Benedyk et al. |
| 7,844,745 | B1 | 11/2010 | Darbyshire et al. |
| 7,916,685 | B2 | 3/2011 | Schaedler et al. |
| 7,996,541 | B2 | 8/2011 | Marathe et al. |
| 8,015,293 | B2 | 9/2011 | Schaedler et al. |
| 8,125,999 | B2 | 2/2012 | Yasrebi et al. |
| 8,532,110 | B2 | 9/2013 | McCann et al. |
| 8,547,908 | B2 | 10/2013 | Marsico |
| 8,615,237 | B2 | 12/2013 | Baniel et al. |
| 8,737,304 | B2 | 5/2014 | Karuturi et al. |
| 8,825,060 | B2 | 9/2014 | McCann et al. |
| 8,831,076 | B2 | 9/2014 | Yen |
| 8,918,469 | B2 | 12/2014 | Sprague et al. |
| 8,942,747 | B2 | 1/2015 | Marsico |
| 9,059,948 | B2 | 6/2015 | Schaedler et al. |
| 9,148,524 | B2 | 9/2015 | Deo |
| 9,288,169 | B2 | 3/2016 | Schaedler et al. |
| 9,319,378 | B2 | 4/2016 | McCann |
| 9,398,470 | B2* | 7/2016 | Roeland .................. H04L 12/14 |
| 9,668,134 | B2 | 5/2017 | McCann |
| 9,668,135 | B2 | 5/2017 | McCann |
| 9,918,229 | B2 | 3/2018 | McCann |
| 9,923,984 | B2 | 3/2018 | McCann et al. |
| 9,930,528 | B2 | 3/2018 | McCann |
| 10,084,755 | B2 | 9/2018 | McCann |
| 10,554,661 | B2 | 2/2020 | McCann |
| 2001/0028636 | A1 | 10/2001 | Skog et al. |
| 2002/0147845 | A1 | 10/2002 | Sanchez-Herrero |
| 2002/0194378 | A1 | 12/2002 | Foti |
| 2002/0196775 | A1 | 12/2002 | Tuohino et al. |
| 2003/0040280 | A1 | 2/2003 | Koskelainen |
| 2003/0131151 | A1 | 7/2003 | Roach et al. |
| 2004/0098612 | A1 | 5/2004 | Lee et al. |
| 2004/0103157 | A1 | 5/2004 | Requena et al. |
| 2004/0152469 | A1 | 8/2004 | Yla-Outinen et al. |
| 2004/0205212 | A1 | 10/2004 | Huotari et al. |
| 2004/0223489 | A1 | 11/2004 | Rotsten et al. |
| 2004/0225878 | A1 | 11/2004 | Costa-Requena et al. |
| 2004/0242227 | A1 | 12/2004 | Huotari et al. |
| 2004/0246965 | A1 | 12/2004 | Westman et al. |
| 2004/0260816 | A1 | 12/2004 | Skog et al. |
| 2005/0007984 | A1 | 1/2005 | Shaheen et al. |
| 2005/0009520 | A1 | 1/2005 | Herrero et al. |
| 2005/0058125 | A1 | 3/2005 | Mutikainen et al. |
| 2005/0078642 | A1 | 4/2005 | Mayer et al. |
| 2005/0094594 | A1 | 5/2005 | Roh |
| 2005/0120198 | A1 | 6/2005 | Bajko et al. |
| 2005/0124341 | A1 | 6/2005 | Myllymaki et al. |
| 2005/0136926 | A1 | 6/2005 | Tammi et al. |
| 2005/0155036 | A1 | 7/2005 | Tiainen et al. |
| 2005/0159156 | A1 | 7/2005 | Bajko et al. |
| 2005/0227675 | A1 | 10/2005 | Lim et al. |
| 2005/0235000 | A1 | 10/2005 | Keil |
| 2006/0002308 | A1 | 1/2006 | Na et al. |
| 2006/0030320 | A1 | 2/2006 | Tammi et al. |
| 2006/0045249 | A1 | 3/2006 | Li et al. |
| 2006/0068762 | A1 | 3/2006 | Baldwin et al. |
| 2006/0068816 | A1 | 3/2006 | Pelaez et al. |
| 2006/0077926 | A1 | 4/2006 | Rune |
| 2006/0078119 | A1 | 4/2006 | Jee et al. |
| 2006/0136557 | A1 | 6/2006 | Schaedler et al. |
| 2006/0161512 | A1 | 7/2006 | Schaedler et al. |
| 2006/0172730 | A1 | 8/2006 | Matsuda |
| 2006/0221972 | A1 | 10/2006 | Bhargava et al. |
| 2006/0259759 | A1 | 11/2006 | Maino et al. |
| 2006/0274744 | A1 | 12/2006 | Nagai et al. |
| 2007/0121596 | A1 | 5/2007 | Kurapati et al. |
| 2007/0136590 | A1 | 6/2007 | Nah et al. |
| 2007/0153995 | A1 | 7/2007 | Fang et al. |
| 2007/0189215 | A1 | 8/2007 | Wu et al. |
| 2007/0242637 | A1 | 10/2007 | Dynarski et al. |
| 2007/0297419 | A1 | 12/2007 | Asherup et al. |
| 2008/0002652 | A1 | 1/2008 | Gupta et al. |
| 2008/0039104 | A1 | 2/2008 | Gu et al. |
| 2008/0256251 | A1 | 10/2008 | Huotari et al. |
| 2009/0080440 | A1 | 3/2009 | Balyan et al. |
| 2009/0089435 | A1 | 4/2009 | Terrill et al. |
| 2009/0129271 | A1 | 5/2009 | Ramankutty et al. |
| 2009/0156213 | A1 | 7/2009 | Spinelli et al. |
| 2009/0177796 | A1 | 7/2009 | Falk et al. |
| 2009/0196231 | A1 | 8/2009 | Giaretta et al. |
| 2009/0196290 | A1 | 8/2009 | Zhao et al. |
| 2009/0221310 | A1 | 9/2009 | Chen et al. |
| 2009/0232011 | A1 | 9/2009 | Li et al. |
| 2009/0264097 | A1 | 10/2009 | Cai et al. |
| 2009/0265467 | A1 | 10/2009 | Peles |
| 2009/0305684 | A1 | 12/2009 | Jones et al. |
| 2009/0313379 | A1 | 12/2009 | Rydnell et al. |
| 2010/0268814 | A1 | 10/2010 | Cross et al. |
| 2010/0290392 | A1 | 11/2010 | Rasanen et al. |
| 2010/0291923 | A1 | 11/2010 | Zhou et al. |
| 2010/0299451 | A1 | 11/2010 | Yigang et al. |
| 2010/0311392 | A1 | 12/2010 | Stenfelt et al. |
| 2010/0331023 | A1 | 12/2010 | Cai et al. |
| 2011/0040845 | A1 | 2/2011 | Cai et al. |
| 2011/0116378 | A1 | 5/2011 | Ramankutty et al. |
| 2011/0116382 | A1 | 5/2011 | McCann et al. |
| 2011/0154454 | A1 | 6/2011 | Frelechoux |
| 2011/0158090 | A1 | 6/2011 | Riley et al. |
| 2011/0165901 | A1 | 7/2011 | Baniel et al. |
| 2011/0199906 | A1 | 8/2011 | Kanode et al. |
| 2011/0200053 | A1 | 8/2011 | Kanode et al. |
| 2011/0202612 | A1 | 8/2011 | Craig et al. |
| 2011/0202614 | A1 | 8/2011 | Craig et al. |
| 2011/0202676 | A1 | 8/2011 | Craig et al. |
| 2011/0211574 | A1 | 9/2011 | Li et al. |
| 2011/0225113 | A1 | 9/2011 | Mann |
| 2011/0225280 | A1 | 9/2011 | Delsesto et al. |
| 2011/0225281 | A1 | 9/2011 | Riley et al. |
| 2011/0225306 | A1 | 9/2011 | Delsesto et al. |
| 2011/0282904 | A1 | 11/2011 | Schaedler et al. |
| 2011/0302244 | A1 | 12/2011 | McCann et al. |
| 2011/0314178 | A1 | 12/2011 | Kanode et al. |
| 2012/0089993 | A1 | 4/2012 | Alonso Alarcon et al. |
| 2012/0096177 | A1 | 4/2012 | Rasanen |
| 2012/0124220 | A1 | 5/2012 | Zhou et al. |
| 2012/0129488 | A1 | 5/2012 | Patterson et al. |
| 2012/0155389 | A1 | 6/2012 | McNamee et al. |
| 2012/0155470 | A1 | 6/2012 | McNamee et al. |
| 2012/0177028 | A1* | 7/2012 | Mo ..................... H04L 12/1407 |
| | | | 370/351 |
| 2012/0201203 | A1 | 8/2012 | Miyagawa et al. |
| 2012/0202550 | A1* | 8/2012 | Marsico .................. H04W 8/08 |
| | | | 455/515 |
| 2012/0207015 | A1 | 8/2012 | Marsico |

(56) References Cited

U.S. PATENT DOCUMENTS

| | | | |
|---|---|---|---|
| 2012/0224524 A1 | 9/2012 | Marsico | |
| 2012/0224531 A1 | 9/2012 | Karuturi et al. | |
| 2012/0225679 A1* | 9/2012 | McCann | H04L 45/64 |
| | | | 455/466 |
| 2012/0226758 A1 | 9/2012 | Sprague et al. | |
| 2012/0226814 A1 | 9/2012 | Stucker | |
| 2012/0236871 A1 | 9/2012 | Wallace et al. | |
| 2012/0239771 A1 | 9/2012 | Rasanen | |
| 2012/0265888 A1 | 10/2012 | Roeland et al. | |
| 2012/0311064 A1 | 12/2012 | Deo | |
| 2013/0171990 A1 | 7/2013 | McCann et al. | |
| 2013/0246639 A1 | 9/2013 | Nedbal et al. | |
| 2013/0279497 A1* | 10/2013 | Verma | H04L 69/18 |
| | | | 370/352 |
| 2013/0304843 A1 | 11/2013 | Chow et al. | |
| 2013/0311672 A1 | 11/2013 | Chastain | |
| 2014/0092899 A1 | 4/2014 | Krishna et al. | |
| 2014/0207941 A1 | 7/2014 | McCann | |
| 2014/0258423 A1 | 9/2014 | Schaedler et al. | |
| 2014/0321278 A1 | 10/2014 | Cafarelli et al. | |
| 2014/0342690 A1 | 11/2014 | Tanouchev et al. | |
| 2014/0355523 A1 | 12/2014 | Congdon et al. | |
| 2015/0036486 A1* | 2/2015 | McMurry | H04L 47/12 |
| | | | 370/229 |
| 2015/0117420 A1 | 4/2015 | Raman et al. | |
| 2015/0149656 A1 | 5/2015 | McMurry et al. | |
| 2017/0048190 A1 | 2/2017 | McCann | |
| 2017/0048202 A1 | 2/2017 | McCann | |
| 2017/0048703 A1 | 2/2017 | McCann | |
| 2017/0048704 A1 | 2/2017 | McCann | |
| 2017/0126522 A1 | 5/2017 | McCann et al. | |
| 2017/0238178 A1 | 8/2017 | McCann | |
| 2017/0238179 A1 | 8/2017 | McCann | |

FOREIGN PATENT DOCUMENTS

| | | |
|---|---|---|
| CN | 101079742 A | 11/2007 |
| CN | 101247321 A | 8/2008 |
| CN | 101277541 A | 10/2008 |
| CN | 101483826 A | 7/2009 |
| CN | 101867873 A | 10/2010 |
| CN | 101945047 A | 1/2011 |
| CN | 102239481 A | 11/2011 |
| CN | 102656845 A | 9/2012 |
| CN | ZL 201080065174.6 | 6/2015 |
| CN | 100037 | 7/2016 |
| CN | 103477661 B | 10/2016 |
| CN | ZL201280019607.3 | 12/2016 |
| CN | ZL201280013938.6 | 3/2017 |
| CN | ZL201280018298.8 | 3/2017 |
| CN | ZL201280018288.4 | 4/2017 |
| CN | ZL201480005758.2 | 7/2019 |
| EP | 1 357 720 A1 | 10/2003 |
| EP | 1 630 999 A1 | 3/2006 |
| EP | 2 107 725 A1 | 10/2009 |
| EP | 2 234 422 A1 | 9/2010 |
| EP | 2 242 205 A1 | 10/2010 |
| EP | 2 220 841 B1 | 9/2011 |
| EP | 1 846 832 B1 | 4/2012 |
| EP | 2 466 828 A1 | 6/2012 |
| EP | 2 522 103 A2 | 11/2012 |
| EP | 2 577 930 A2 | 4/2013 |
| EP | 2 681 940 B1 | 5/2016 |
| EP | 2 681 939 B1 | 9/2016 |
| EP | 2 522 102 B1 | 11/2016 |
| EP | 2 681 938 B2 | 12/2016 |
| EP | 2 671 396 B1 | 7/2019 |
| EP | 2 681 937 B1 | 9/2019 |
| EP | 2 949 109 B1 | 10/2019 |
| IN | 319441 | 8/2019 |
| JP | H10-98470 A | 4/1998 |
| JP | H11-224219 A | 8/1999 |
| JP | 2004-242326 A | 8/2004 |
| JP | 2006-513631 | 4/2006 |
| JP | 4041038 B2 | 1/2008 |
| JP | 2009-537102 | 10/2009 |
| JP | 2010-527520 | 8/2010 |
| JP | 2010-0278884 A | 12/2010 |
| JP | 2013-527999 T | 7/2013 |
| JP | 5732550 B2 | 6/2015 |
| JP | 5758508 B2 | 8/2015 |
| JP | 5759064 B2 | 8/2015 |
| JP | 5938052 B2 | 6/2016 |
| JP | 5950943 B2 | 7/2016 |
| JP | 6091657 B2 | 2/2017 |
| WO | WO 2004/064442 A1 | 7/2004 |
| WO | WO 2006/066149 A2 | 6/2006 |
| WO | WO 2009/058067 A1 | 5/2009 |
| WO | WO 2009/070179 A1 | 6/2009 |
| WO | WO 2009/086759 A1 | 7/2009 |
| WO | WO 2010/139360 A1 | 12/2010 |
| WO | WO 2011/082035 A2 | 7/2011 |
| WO | WO 2011/082090 A2 | 7/2011 |
| WO | WO 2011/082895 A1 | 7/2011 |
| WO | WO 2011/156274 A2 | 12/2011 |
| WO | WO 2012/106710 A1 | 8/2012 |
| WO | WO 2012/118959 A1 | 9/2012 |
| WO | WO 2012/118963 A1 | 9/2012 |
| WO | WO 2012/118967 A1 | 9/2012 |
| WO | WO 2012/119147 A1 | 9/2012 |
| WO | WO 2012/154674 A2 | 11/2012 |
| WO | WO 2014/116464 A1 | 7/2014 |

OTHER PUBLICATIONS

C., Xue, Y., Dong, Y., & Wang, D. (2012). MCC: A message and command correlation method for identifying new interactive protocols via session analyses. Tsinghua Science and Technology, 17(3), 344-53, 2012 (Year: 2012).*

M. Yajnik, J. Kurose and D. Towsley, "Packet loss correlation in the MBone multicast network," Proceedings of GLOBECOM'96. 1996 IEEE Global Telecommunications Conference, London, UK, 1996, pp. 94-99, doi: 10.1109/GLOCOM.1996 (Year: 1996).*

Letter Regarding Decision to Grant a Chinese Patent for Chinese Patent Appication No. ZL201280019607.3 (Oct. 10, 2016).

Notification of the Second Office Action for Chinese Patent Application No. 201280013938.6 (dated Oct. 9, 2016).

Notification of the Second Office Action for Chinese Patent Application No. 201280018288.4 (dated Sep. 5, 2016).

Communication under Rule 71(3) EPC for European Patent Application No. 12 751 812.4 (dated Sep. 2, 2016).

Non-Final Office Action for U.S. Appl. No. 14/827,025 (dated Aug. 26, 2016).

Decision to grant a European patent pursuant to Article 97(1) EPC for European Patent Application No. 12751986.6 (dated Aug. 19, 2016).

Commonly-assigned, co-pending U.S. Appl. No. 14/929,283 for "Methods, Systems, and Computer Readable Media for Remote Access Dial in User Service (RADIUS) Proxy and Diameter Agent Address Resolution." (Unpublished filed Oct. 31, 2015).

Commonly-assigned, co-pending U.S. Appl. No. 14/928,660 for "Methods, Systems, and Computer Readable Media for Remote Authentication Dial in User Service (RADIUS) Message Loop Detection and Mitigation," (Unpublished, filed Oct. 30, 2015).

Commonly-assigned, co-pending U.S. Appl. No. 14/826,289 for "Methods, Systems, and Computer Readable Media for Providing Access Network Session Correlation for Policy Control," (Unpublished, filed Aug. 14. 2015).

Commonly-assigned, co-pending U.S. Appl. No. 14/827,015 for "Methods, Systems, and Computer Readable Media for Providing Access Network Protocol Interworking and Authentication Proxying," (Unpublished, filed Aug. 14, 2015).

Commonly-assigned, co-pending U.S. Appl. No. 14/827,025 for "Methods, Systems, and Computer Readable Media for Providing Access Network Signaling Protocol Interworking for User Authentication," (Unpublished, filed Aug. 14, 2015).

Fajardo et al., "Diameter Base Protocol," RFC 6733, pp. 1-152 (Oct. 2012).

(56) References Cited

OTHER PUBLICATIONS

"Multi-Protocol Routing Agent User's Guide," 910-6404-001 Revision A, Policy Management, Tekelec, pp. 1-70 (Jun. 2012).
"Traffix Signaling Delivery Controller—One Platform to Deliver the Wonders of 4G," Traffix Systems, The Diameter Control Plane Experts, pp. 1-7 (2011).
"Traffix Signaling Delivery Controller (SDC)," Traffix Systems, The Diameter Control Plane Experts, pp. 1-5 (2011).
"Traffix Signaling Delivery Controller (SDC) Diameter Gateway—Use Case Development Scenarios," Traffix Systems, The Diameter Control Plane Experts, www.traffixsystems.com pp. 1-4 (2011).
"Traffix Signaling Delivery Controller Diameter Load Balancer: Scalability for your Control Plane," Traffix Systems, The Diameter Control Plane Experts, www.traffixsystems.com pp. 1-3 (2011).
Gundavelli et al., "Network Mobility (NEMO) Management Information Base," RFC 5488, pp. 1-44 (Apr. 2009).
Arkko et al., "Extensible Authentication Protocol Method for 3rd Generation Authentication and Key Agreement (EAP-AKA)," RFC 4187, pp. 1-79 (Jan. 2006).
Haverinen et al., "Extensible Authentication Protocol Method for Global System for Mobile Communications (GSM) Subscriber Identity Modules (EAP-SIM)," RFC 4186, pp. 1-80 (Jan. 2006).
Aboba et al., "Extensible Authentication Protocol (EAP)," RFC 3748, pp. 1-67 (Jun. 2004).
Calhoun et al., "Diameter Base Protocol," RFC 3588, pp. 1-147 (Sep. 2003).
Aboba et al., "RADIUS (Remote Authentication Dial In User Service) Support for Extensible Authentication Protocol (EAP)," RFC 3579, pp. 1-46 (Sep. 2003).
"ITP Operations Manual," Cisco Systems, Inc., pp. 1-320 (May 1, 2002).
"Configuring ITP Optional Features," IP Transfer Point, Cisco Systems, Inc., pp. 29-76 (2001).
"Cisco IP Transfer Point Q & A," Cisco Systems, Inc., pp. 1-15 (1992-2001).
Rigney et al., "RADIUS Accounting," RFC 2866, pp. 1-28 (Jun. 2000).
Communication under Rule 71(3) EPC for European Application No. 12 751 986.6 (dated Jun. 8, 2016).
Letter Regarding Notice of grant for Japanese Patent Application No. 2013-552714 (May 31, 2016).
Decision to grant a European patent pursuant to Article 97(1) EPC for European Application No. 12752952.7 (dated Apr. 29, 2016).
Official Notice of Grant for Japanese Patent Application No. 2013-556860 (dated Apr. 26, 2016).
Notification of the First Office Action for Chinese Patent Application No. 201280018298.8 (dated Mar. 3, 2016).
Communication pursuant to Article 94(3) EPC for European Patent Application No. 10841605.8 (dated Feb. 22, 2016).
Communication under Rule 71(3) EPC for European Patent Application No. 12752952.7 (dated Feb. 10, 2016).
Letter Regarding Notice of Grant for Japanese Patent Application No. 2013-556855 (Feb. 2, 2016).
Notification of the First Office Action for Chinese Application No. 201280019607.3 (dated Feb. 1, 2016).
Notification of the First Office Action for Chinese Application No. 201280013938.6 (dated Jan. 27, 2016).
Notification of the First Office Action for Chinese Application No. 201280018297.3 (dated Jan. 15, 2016).
Notification of the First Office Action for Chinese Application No. 201280018288.4 (dated Dec. 29, 2015).
Communication pursuant to Article 94(3) EPC for European Application No. 12 751 986.6 (dated Dec. 22, 2015).
Notice of Allowance and Fee(s) Due for U.S. Appl. No. 13/748,547 (dated Dec. 11, 2015).
Letter Regarding Office Action for Japanese Patent Application No. 2013-552714 (Dec. 8, 2015).
Letter Regarding Final Rejection for Japanese Patent Application No. 2013-556860 (Nov. 17, 2015).

Communication of European publication number and information on the application of Article 67(3) EPC for European Application No. 14702996.1 (dated Nov. 4, 2015).
Notice of Allowance and Fee(s) Due and Applicant-Initiated Interview Summary for U.S. Appl. No. 14/190,071 (dated Oct. 30, 2015).
Advisory Action for U.S. Appl. No. 13/748,547 (dated Oct. 16, 2015).
Supplemental Notice of Allowability & Response to Rule 312 Communication for U.S. Appl. No. 13/465,552 (dated Aug. 27, 2015).
Final Office Action for U.S. Appl. No. 13/748,547 (dated Aug. 10, 2015).
Letter Regarding Publication of Patent for Japanese Patent Application No. 2014-509509 (Aug. 5, 2015).
Letter Regarding Publication of Patent for Japanese Patent Application No. 2013-556857 (Aug. 5, 2015).
Letter Regarding Office Action for Japanese Patent Application No. 2013-556860 (Jul. 21, 2015).
Non-Final Office Action for U.S. Appl. No. 14/190,071 (dated Jul. 8, 2015).
Letter Regarding Publication of Patent for Japanese Patent Application No. 2013-556675 (Jun. 10, 2015).
Letter Regarding Notice of Grant for Japanese Patent Application No. 2014-509509 (Jun. 2, 2015).
Letter Regarding Notice of Grant for Japanese Patent Application No. 2013-556857 (May 26, 2015).
Notice of Allowance and Fee(s) Due and Examiner-Initiated Interview Summary for U.S. Appl. No. 13/465,552 (dated May 20, 2015).
Decision to Grant for Chinese Patent Application No. 201080065174.6 (dated Apr. 16, 2015).
Second Office Action for Japanese Patent Application No. 2013-556857 (dated Apr. 14, 2015).
Letter Regarding Notice of Grant for Japanese Patent Application No. 2013-556675 (Mar. 31, 2015).
Letter Regarding Office Action for Japanese Patent Application No. 2013-556855 (Feb. 24, 2015).
Notice of Allowance and Fee(s) Due and Examiner-Initiated Interview Summary for U.S. Appl. No. 13/192,410 (dated Feb. 12, 2015).
Applicant-Initiated Interview Summary for U.S. Appl. No. 13/465,552 (dated Feb. 9, 2015).
Notice of Panel Decision from Pre-Appeal Brief Review for U.S. Appl. No. 13/192,410 (Feb. 4, 2015).
Extended European Search Report for European Patent Application No. 12751986.6 (dated Jan. 20, 2015).
Non-Final Office Action for U.S. Appl. No. 13/748,547 (dated Jan. 5, 2015).
Supplemental Notice of Allowability for U.S. Appl. No. 13/366,928 (dated Dec. 26, 2014).
Non-Final Office Action for U.S. Appl. No. 13/465,552 (dated Oct. 17, 2014).
Letter Regarding Office Action for Japanese Patent Application No. 2013-556675 (Sep. 30, 2014).
Final Office Action for U.S. Appl. No. 13/192,410 (dated Sep. 25, 2014).
First Office Action for Japanese Application No. 2013-556857 (dated Sep. 24, 2014).
Notice of Allowance and Fee(s) Due for U.S. Appl. No. 13/366,928 (dated Sep. 3, 2014).
Extended European Search Report for European Application No. 12752952.7 (dated Aug. 27, 2014).
Notification of the First Office Action for Chinese Application No. 201080065174.6 (dated Aug. 13, 2014).
Extended European Search Report for European Application No. 12751783.7 (dated Jul. 22, 2014).
Extended European Search Report for European Application No. 12751812.4 (dated Jul. 16, 2014).
Notice of Allowance and Fee(s) Due for U.S. Appl. No. 13/409,893 (dated Jul. 10, 2014).
Notice of Allowance and Fee(s) Due for U.S. Appl. No. 13/409,914 (dated Apr. 25, 2014).

(56) References Cited

OTHER PUBLICATIONS

Supplemental Notice of Allowability for U.S. Appl. No. 13/409,949 (dated Apr. 24, 2014).
Notification of Transmittal of the International Search Report and the Written Opinion of the International Searching Authority, or the Declaration for International Patent Application No. PCT/US2014/011548 (dated Mar. 28, 2014).
Non-Final Office Action for U.S. Appl. No. 13/366,928 (dated Mar. 21, 2014).
Non-Final Office Action for U.S. Appl. No. 13/192,410 (dated Feb. 20, 2014).
Communication of European publication number and information on the application of Article 67(3) EPC for European Application No. 12781800.3 (dated Feb. 12, 2014).
Advisory Action Before the Filing of an Appeal Brief for U.S. Appl. No. 13/366,928 (dated Feb. 10, 2014).
Extended European Search Report for European Application No. 10841605.8 (dated Feb. 3, 2014).
Notice of Allowance and Fee(s) Due for U.S. Appl. No. 13/409,949 (dated Jan. 14, 2014).
Final Office Action for U.S. Appl. No. 13/409,914 (dated Dec. 30, 2013).
Notification of Publication and Entry into Examination Procedure for Chinese Patent Application No. 201280013938.6 (dated Dec. 18, 2013).
Communication of European publication number and information on the application of Article 67(3) EPC for European Application No. 12751986.6 (dated Dec. 11, 2013).
Communication of European publication number and information on the application of Article 67(3) EPC for European Application No. 12751783.7 (dated Dec. 11, 2013).
Communication of European publication number and information on the application of Article 67(3) EPC for European Application No. 12751812.4 (dated Dec. 11, 2013).
Communication of European publication number and information on the application of Article 67(3) EPC for European Application No. 12741984.4 (dated Nov. 13, 2013).
Declaration of Mark Kanode for U.S. Appl. No. 13/409,893 (dated Nov. 1, 2013).
Advisory Action for U.S. Appl. No. 13/192,410 (dated Oct. 24, 2013).
Final Office Action for U.S. Appl. No. 13/366,928 (dated Oct. 23, 2013).
Applicant-Initiated Interview Summary for U.S. Appl. No. 13/192,410 (dated Oct. 18, 2013).
Final Office Action for U.S. Appl. No. 13/409,949 (dated Sep. 19, 2013).
Advisory Action Before the Filing of an Appeal Brief for U.S. Appl. No. 13/409,893 (dated Sep. 13, 2013).
Notice of Allowance and Fee(s) Due for U.S. Appl. No. 12/974,869 (dated Aug. 19, 2013).
Final Office Action for U.S. Appl. No. 13/192,410 (dated Aug. 5, 2013).
Final Office Action for U.S. Appl. No. 13/409,893 (dated Jul. 1, 2013).
Non-Final Office Action for U.S. Appl. No. 13/409,914 (dated Jun. 7, 2013).
Notice of Allowance and Fee(s) Due for U.S. Appl. No. 13/412,352 (dated May 28, 2013).
Non-Final Office Action for U.S. Appl. No. 13/366,928 (dated Mar. 26, 2013).
Non-Final Office Action for U.S. Appl. No. 13/409,949 (dated Feb. 15, 2013).
Notice of Allowance and Fee(s) Due for U.S. Appl. No. 13/366,928 (dated Jan. 7, 2013).
Non-Final Office Action for U.S. Appl. No. 13/192,410 (dated Dec. 20, 2012).
Non-Final Office Action for U.S. Appl. No. 13/409,893 (dated Dec. 13, 2012).
Non-Final Official Action for U.S. Appl. No. 12/409,914 (dated Nov. 6, 2012).
Notification of Transmittal of the International Search Report and the Written Opinion of the International Searching Authority, or the Declaration for International Patent Application No. PCT/US2012/036784 (dated Nov. 1, 2012).
Non-Final Official Action for U.S. Appl. No. 13/412,352 (dated Oct. 26, 2012).
Communication of European publication number and information on the application of Article 67(3) EPC for European Patent Application No. 10841605.8 (dated Oct. 17, 2012).
Notification of Transmital of the International Search Report and the Written Opinion of the International Searching Authority, or the Declaration for International Patent Application No. PCT/US2012/027281 (dated Jun. 15, 2012).
Notification of Transmittal of the Internatioal Search Report and the Written Opinion of the International Searching Authority, or the Declaration for International Application No. PCT/US2012/027263 (dated Jun. 14, 2012).
Notification of Transmittal of the International Search Report and the Written Opinion of the International Searching Authority, or the Declaration for International Patent Application No. PCT/US2012/027736 (dated Jun. 12, 2012).
Notification of Transmittal of the International Search Report and the Written Opinion of the International Searching Authority, or the Declaration for International Patent Application No. PCT/US2012/023971 (dated Jun. 11, 2012).
Notification of Transmittal of the International Search Report and the Written Opinion of the International Searching Authority, or the Declaration for International Patent Application No. PCT/US2012/027269 (dated Jun. 11, 2012).
Decision to grant a European patent pursuant to Article 97(1) EPC for European Application No. 05854512.0 (dated Mar. 15, 2012).
Communication under Rule 71(3) EPC for European application No. 05854512.0 (dated Nov. 11, 2011).
Notification of the Transmittal of the International Search Report and the Written Opinion of the International Searching Authority, or the Declaration for International Application No. PCT/US2010/061934 (dated Oct. 25, 2011).
Notice of Allowance and Fee(s) Due for U.S. Appl. No. 11/303,757 (dated May 11, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).
3GPP, "3rd Generation Partnership Project; Technical Specification Group Services and System Aspects; Policy and Charging Control Architecture (Release 11)," 3GPP TS 23.203 V11.0.1, pp. 1-137 (Jan. 2011).
Official Action for U.S. Appl. No. 11/303,757 (dated Dec. 22, 2010).
3GPP, "3rd Generation Partnership Project; Technical Specification Group Core Network and Terminals; Sh Interface based on the Diameter protocol; Protocol details (Release 8)," 3GPP TS 29.329, V8.8.0 (Dec. 2010).
Communication pursuant to Article 94(3) EPC for European Application No. 05 854 512.0 (dated Oct. 12, 2010).
"Digital cellular telecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228, V9.4.0 (Oct. 2010).
"Digital cellular telecommunications system (Phase 2+); Universal Mobile Telecommunications System (UMTS); LTE; End-to-end Quality of Service (QoS) concept and architecture (3GPP TS 23.207 version 9.0.0 Release 9)," ETSI TS 123 207, V9.0.0 (Oct. 2010).
"3rd Generation Partnership Project; Technical Specification Group Services and System Aspects; Telecommunication management; Charging management; Packet Switched (PS) domain charging (Release 9)," 3GPP TS 32.251, V9.4.0 (Oct. 2010).
"3rd Generation Partnership Project; Technical Specification Group Services and System Aspects; Telecommunication management; Charging management; Diameter charging applications (Release 9)," 3GPP TS 32.299, V9.4.0 (Jun. 2010).

(56) References Cited

OTHER PUBLICATIONS

"3rd Generation Partnership Project; Technical Specification Group Services and System Aspects; Telecommunication management; Charging management; Charging architecture and principles (Release 9)," 3GPP TS 32.240, V9.1.0 (Jun. 2010).
Znaty, "Diameter, GPRS, (LTE+ePC=EPS), IMS, PCC and SDM," EFORT, pp. 1-229 (Part 1 of 2) (May 2010).
Znaty, "Diameter, GPRS, (LTE+ePC=EPS), IMS, PCC and SDM," EFORT pp. 230-461 (Part 2 of 2) (May 2010).
3GPP, "3rd Generation Partnership Project; Technical Specification Group Core Network and Terminals; Policy and Charging Control signalling flows and Quality of Service (QoS) parameter mapping (Release 9)," 3rd Generation Partnership Project, TS 29.213 V9.2.0, pp. 1-129 (Mar. 2010).
"3rd Generation Partnership Project; Technical Specification Group Core Network and Terminals; Policy and Charging Control over Gx reference point (Release 9)," 3GPP TS 29.212 V9.2.0 (Mar. 2010).
Communication pursuant to Article 94(3) EPC for European Application No. 05854512.0 (dated Feb. 8, 2010).
Final Official Action for U.S. Appl. No. 11/303,757 (dated Dec. 9, 2009).
"3rd Generation Partnership Project; Technical Specification Group Services and System Aspects; Policy and charging control architecture (Release 9)," 3GPP TS 23.203, V9.3.0 (Dec. 2009).
Supplementary European Search Report for European Application No. 05854512.0 (dated Nov. 17, 2009).
Official Action for U.S. Appl. No. 11/303,757 (dated May 28, 2009).
"Cisco Content Services Gateway—2nd Generation Release 3.5 Installation and Configuration Guide," Chapter 10: Configuring Gx Support, pp. 10-1-10-10, Chapter 11: Configuring Mobile PCC Support, pp. 11-1-11-8, URL: http://www.cisco.com/en/US/docs/wireless/csg2/3.5/installation/guide/csg3-51.pdf (Jun. 5, 2009).
3GPP, "3rd Generation Partnership Project; Technical Specification Group Core Network and Terminals; IP Multimedia (IM) Subsystem Sh interface; Signalling flows and message contents (Release 8)," 3GPP TS 29.328 V8.4.0, pp. 1-42 (Mar. 2009).
Final Official Action for U.S. Appl. No. 11/303,757 (dated Oct. 6, 2008).
Official Action for U.S. Appl. No. 11/303,757 (dated May 7, 2008).
Notification of Transmittal of the International Search Report and the Written Opinion corresponding to International Application No. PCT/US05/45813 (dated Mar. 24, 2008).
Official Action for U.S. Appl. No. 11/303,757 (dated Feb. 21, 2008).
Chiba et al., "Dynamic Authorization Extensions to Remote Authentication Dial in User Service (RADIUS)," RFC 5176, pp. 1-32 (Jan. 2008).
Restriction Requirment for U.S. Appl. No. 11/303,757 (dated Oct. 4, 2007).
"Tekelec Announces TekCore IMS Core Platform," (Jun. 5, 2006).
"Operator Guidebook to IMS and New Generation Networks and Services," www.morianagroup.com, Second Edition (Feb. 2006).
Liu et al., "IBM Technical Library, Introduction to Diameter," pp. 1-9, http://www.ibm.com/developerworks/wireless/library/wi-diameter (Jan. 24, 2006).
Rouse, "Platform," http://searchservervirtualization.techtarget.com/definition/platform, pp. 1-2 (2006-2009).
Camarillo et al., "The 3G IP Multimedia Subsystem (IMS), Merging the Internet and the Cellular Worlds," Second Edition (2006).
Hakala et al., "Diameter Credit-Control Application," RFC 4006, pp. 1-114 (Aug. 2005).
Calhoun et al., "Diameter Network Access Server Application," RFC 4005, pp. 1-85 (Aug. 2005).
Calhoun et al., "Diameter Mobile IPv4 Application," RFC 4004, pp. 1-53 (Aug. 2005).
"Operator Guidebook to IMS and New Generation Networks and Services," www.morianagroup.com, First Edition, pp. 1-450 (Aug. 2005) (Part 1 of 2).
"Operator Guidebook to IMS and New Generation Networks and Services," www.morianagroup.com, First Edition, pp. 451-934 (Aug. 2005) (Part 2 of 2).

Gonzalo et al., "The 3G IP Multimedia Subsystem," Chapter 3: General Principles of the IMS Architecture (Aug. 20, 2004).
"IP Multimedia Subsystem IMS Over and Applications," 3G Americas, pp. 1-17 (Jul. 2004).
"3rd Generation Partnership Project; technical Specification Group Core Network; IP Multimedia (IM) Session Handling; IM Call Model; Stage 2 (Release 6)," 3GPP TS 23.218, V6.1.0, pp. 1-56 (Mar. 2004).
"IMS Security Framework," 3GPP2 S.R0086-0, Version 1.0, pp. 1-39 (Dec. 11, 2003).
"IP Multimedia Subsystem—Accounting Information Flows and Protocol," 3GPP2 X.S0013-008-0, Version 1.0, pp. 1-42 (Dec. 2003).
"IP Multimedia Subsystem—Charging Architecture," 3GPP2 X.S0013-007-0, Version 1.0, pp. 1-16 (Dec. 2003).
"All-IP Core Network Multimedia Domain," 3rd Generation Partnerships Project 2 (3GPP2), 3GPP2 X.S0013-000-0, Version 1.0, pp. i-ii and 1-14 (Dec. 2003).
"3rd Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003).
"Digital Cellular Telecommunications System (Phase 2+); Universal Mobile Telecommunications System (UMTS); IP Multimedia Subsystem (IMS); Stage 2 (Release 5)," 3GPP TS 23.228, V5.7.0, pp. 1-130 (Dec. 2002).
Olson et al., "Support for IPv6 in Session Description Protocol (SDP)," RFC 3266, pp. 1-5 (Jun. 2002).
Rosenberg et al., "SIP: Session Initiation Protocol," RFC 3261, pp. 1-252 (Jun. 2002).
Howard, "Sipping IETF51 3GPP Security and Authentication," http://www3.ietf.org/proceedings/01aug/slides/sipping-7/index.htm (Dowloaded from Internet on Dec. 16, 2005) (Sep. 13 2001).
Calhoun et al., "Diameter Base Protocol,"draft-ietf-aaa-diameter-07, Section 6.3, p. 68 (Jul. 2001).
Narten et al., "Privacy Extensions for Stateless Address Autoconfiguration in IPv6," RFC 3041, pp. 1-16 (Jan. 2001).
Faltstrom, "E.164 Number and DNS," RFC 2916, pp. 1-10 (Sep. 2000).
Rigney et al., "Remote Authentication Dial in User Service (RADIUS)," RFC 2865, pp. 1-70 (Jun. 2000).
Vaha-Sipila, "URLs for Telephone Calls," RFC 2806, pp. 1-20 (Apr. 2000).
Aboba et al., "The Network Access Identifier," RFC 2486, pp. 1-8 (Jan. 1999).
Calhoun et al., "Diameter Proxy Server Extensions," IETF Working Draft, draft-calhoun-diameter-proxy-01.txt (Aug. 1, 1998).
Berners-Lee et al., "Uniform Resource Identifiers (URI): Generic Syntax," RFC 2396, pp. 1-38 (Aug. 1998).
Tekelec, "Eagle® Feature Guide," P/N 910-1225-01 (Jan. 1998).
Jalava, "Service Routing in 3GPP IP Multimedia Subsystem," Nokia, pp. 1-16 (Publication Date Unknown).
Intent to Grant for European Patent Application No. 10841605.8 (dated Aug. 12, 2016).
Letter Regarding Office Action for Japanese Patent Application No. 2015-553784 (Jul. 19, 2016).
Letter Regarding Notice of Grant for Chinese Patent Application No. ZL201280018297.3 (Jul. 4, 2016).
Non-Final Office Action for U.S. Appl. No. 14/826,289 (dated May 1, 2017).
Commonly-assigned, co-pending U.S. Appl. No. 15/582,591 for "Methods, Systems, and Computer Readable Media for Providing Access Network Protocol Interworking and Authentication Proxying," (Unpublished, filed Apr. 28, 2017).
Commonly-assigned, co-pending U.S. Appl. No. 15/582,503 for "Methods, Systems, and Computer Readable Media for Providing Access Network Signaling Protocol Interworking for User Authentication," (Unpublished, filed Apr. 28, 2017).
Comminication pursuant to Article 94(3) EPC for European Application No. 12 751 783.7 (dated Mar. 15, 2017).
Notice of Allowance and Fee(s) Due for U.S. Appl. No. 14/827,015 (dated Mar. 10, 2017).

(56) References Cited

OTHER PUBLICATIONS

Letter Regarding Decision to Grant for Chinese Application No. ZL201280018288.4 (Feb. 14, 2017).
Letter Regarding Decision to Grant for Chinese Application No. ZL201280013938.6 (Feb. 3, 2017).
Notice of Allowance and Fee(s) Due for U.S. Appl. No. 14/827,025 (dated Jan. 20, 2017).
Letter Regarding Notice of Grant for Japanese Patent Application No. 2015-553784 (Jan. 24, 2017).
Letter Regarding Decision to Grant for Chinese Patent Application No. ZL201280018298.8 (Jan. 10, 2017).
Extended European Search Report for European Patent Application No. 12741984.4 (dated Dec. 20, 2016).
Applicant-Initiated Interview Summary for U.S. Appl. No. 14/827,025 (dated Dec. 13, 2016).
Decision to grant a European patent pursuant to Article 97(1) EPC for European Patent Application No. 12751812.4 (dated Nov. 24, 2016).
Non-Final Office Action for U.S. Appl. No. 14/827,015 (dated Oct. 31, 2016).
Decision to grant a European patent pursuant to Article 97(1) EPC for European Patent Application No. 10841605.8 (dated Oct. 27, 2016).
Non-Final Office Action for U.S. Appl. No. 14/929,283 (dated Aug. 30, 2017).
Final Office Action for U.S. Appl. No. 14/929,283 (dated Feb. 22, 2018).
Notice of Allowance and Fee(s) Due and Applicant-Initiated Interview Summary for U.S. Appl. No. 15/582,503 (dated Oct. 26, 2017).
Advisory Action for U.S. Appl. No. 14/826,289 (dated Feb. 5, 2018).
Final Office Action for U.S. Appl. No. 14/826,289 (dated Nov. 3, 2017).
Notice of Allowance and Fee(s) Due and Applicant-Initiated Interview Summary for U.S. Appl. No. 14/928,660 (dated Nov. 2, 2017).
Notice of Allowance and Fee(s) Due and Applicant-Initiated Interview Summary for U.S. Appl. No. 15/582,591 (dated Nov. 1, 2017).
Applicant Initiated Interview Summary for U.S. Appl. No. 14/826,289 (dated Jul. 27, 2017).
Non-Final Office Action for U.S. Appl. No. 14/928,660 (dated Jul. 21, 2017).
Non-Final Office Action for U.S. Appl. No. 15/582,503 (dated Jun. 30, 2017).
Non-Final Office Action for U.S. Appl. No. 15/582,591 (dated Jun. 30, 2017).
Advisory Action for U.S. Appl. No. 14/929,283 (dated Apr. 12, 2018).
Non-Final Office Action for U.S. Appl. No. 14/826,289 (dated Apr. 5, 2018).
Final Office Action for U.S. Appl. No. 14/826,289 (dated Nov. 2, 2018).
First Examination Report for Indian Patent Application No. 6878/CHENP/2013 (dated Sep. 27, 2018).
Notification of the Second Office Action for Chinese Patent Application No. 201480005758.2 (dated Sep. 27, 2018).
First Examination Report for Indian Patent Application No. 6547/CHENP/2012 (dated Sep. 10, 2018).
Notice of Allowance and Fee(s) Due for U.S. Appl. No. 14/929,283 (dated May 23, 2018).
Communication pursuant to Article 94(3) EPC for European Patent Application Serial No. 14 702 996.1 (dated Nov. 29, 2018).
Decision to grant a European patent pursuant to Article 97(1) EPC for European Patent Application Serial No. 12741984.4 (dated Jun. 27, 2019).
Letter Regarding Notification to Grant of Chinese Patent Application Serial No. 201480005758.2 (Jun. 6, 2019).
Non-Final Office Action for U.S. Appl. No. 14/826,289 (dated May 16, 2019).
Communication under Rule 71(3) EPC of Intention to Grant for European Patent Application Serial No. 14 702 996.1 (dated May 10, 2019).
Office Action for Indian Patent Application Serial No. 8612/CHENP/2013 (dated Apr. 23, 2019).
Communication under Rule 71(3) EPC for European Patent Application Serial No. 12 751 783.7 (dated Apr. 24, 2019).
Hearing Notice for Indian Patent Application Serial No. 6547/CHENP/2012 (Mar. 25, 2019).
Notification of the Third Office Action for Chinese Patent Application Serial No. 201480005758.2 (dated Mar. 4, 2019).
Communication under Rule 71(3) EPC for European Patent Application Serial No. 12 741 984.4 (dated Feb. 12, 2019).
Advisory Action, Examiner-Initiated Interview Summary, and AFCP 2.0 Decision for U.S. Appl. No. 14/826,289 (dated Feb. 1, 2019).
Notification of the First Office Action for Chinese Patent Application No. 201480005758.2 (dated Jan. 2, 2018).
First Examination Report for Indian Patent Application Serial No. 3931/CHENP/2015 (dated Oct. 21, 2019).
Decision to grant a European patent pursuant to Article 97(1) EPC for European Patent Application Serial No. 14702996.1 (dated Sep. 19, 2019).
Notice of Allowance and Fee(s) Due for U.S. Appl. No. 14/826,289 (dated Sep. 13, 2019).
Decision to grant a European patent pursuant to Article 97(1) EPC for European Patent Application Serial No. 12751783.7 (dated Aug. 29, 2019).

* cited by examiner

METHODS, SYSTEMS, AND COMPUTER READABLE MEDIA FOR MULTI-PROTOCOL STATEFUL ROUTING

TECHNICAL FIELD

The subject matter described herein relates to routing traffic in a network. More particularly, the subject matter described herein relates to methods, systems, and computer readable media for multi-protocol stateful routing of traffic within a network.

BACKGROUND

Policy and Charging Rules Functions (PCRFs) are network nodes or servers that perform policy and charging functions for a network. To invoke the policy or charging function of a PCRF, another node establishes a policy or charging session with the PCRF. For example, an access node (e.g., a PDN gateway (PGW) an application function (AF), or the like) may establish a policy session with a PCRF to obtain policy and charging instructions for sessions involving a given client. A Diameter routing agent (DRA) can assign a session to a PCRF and route policy based requests or messages associated with that session to the PCRF to which the corresponding session has been assigned. Once a session is assigned to a PCRF, it is preferable that all traffic associated with that session be routed to the same PCRF until the session is terminated.

A problem exists when a user moves between different types of networks (e.g., wired, wireless, etc.) utilizing nodes that communicate using different protocols. Existing routing functions, such as DRAs, are only configured to route across a single protocol, in some aspects by performing a lookup in a binding table. However, existing binding tables accessed by existing routing functions only utilize keys for a single type of protocol, such as the Diameter protocol. To date, there is not a standard way to route across multiple protocols.

Accordingly, there exists a need for methods, systems, and computer readable media for multi-protocol stateful routing, as it is desirable to route all messages for a given client and/or a given session to a same server and/or to any server that can handle messages communicated using different protocols.

SUMMARY

The subject matter described herein includes methods, systems, and computer readable media for multi-protocol stateful routing. An exemplary method of multi-protocol stateful routing is performed at a multi-protocol stateful router and includes receiving a first message of a client session that is communicated using a first communication protocol, wherein the first message requires processing by one or more policy servers. The method further comprises obtaining, from the first message, one or more client identifiers and determining a policy server that is assigned to the client session. The method further comprises storing the one or more client identifiers and a policy server identifier that is associated with the policy server that is assigned to the client session as a multi-protocol binding record. The method further comprise receiving a second message that is communicated using a second protocol that is different from the first protocol, determining, using the multi-protocol binding record, that the second message is in the client session, and routing the second message to the policy server that is assigned to the client session.

An exemplary multi-protocol stateful routing system comprises a multi-protocol stateful router including at least one processor and at least one network interface. The at least one network interface is configured to receive a first message of a client session that is communicated using a first communication protocol. One or more client identifiers are obtained from the first message. The system further comprises a memory element having binding information stored therein for determining a first policy server that is assigned to the client session, wherein the one or more client identifiers and a first policy server identifier that is associated with the first policy server that is assigned to the client session are stored within the memory element as a multi-protocol binding record. The multi-protocol stateful router is configured to receive a second message that is communicated using a second protocol that is different from the first protocol and determine, using the multi-protocol binding record, that the second message is assigned to the first policy server.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein.

As used herein, the term "policy server" refers to a Policy Charging and Rules Function (PCRF) and/or a node having PCRF functionality or capability.

BRIEF DESCRIPTION OF THE DRAWINGS

The subject matter described herein will now be explained with reference to the accompanying drawings of which.

DETAILED DESCRIPTION

The subject matter described herein relates to routing traffic in a network for subscribers and/or subscriber sessions across multiple protocols to one server or to one pool of servers. Rather than using a routing function to route across a single protocol, methods, systems, and special purpose computing systems executing computer readable media described herein can route all protocol messages, including multiple different protocol messages, for a same user to a same server, for a same user to a same group of servers, and/or to any server that can handle multiple protocols. In some embodiments, multi-protocol stateful routers route messages across multiple, different protocols to a policy server, such as a Policy and Charging Rules Functions (PCRF).

Methods, systems, and computer readable media herein utilize stateful bindings (e.g., binding records) between clients and servers (or machine groups) which are protocol agnostic. The bindings can identify a user through a number of different "keys" or "client identifiers" as described below, which all map to a same destination, or end machine. Every time a new protocol message is received by the multi-protocol stateful router, it first looks to see if there is an existing binding for any of the given keys. If one is found, the binding is updated by adding relevant information contained in the protocol including any new user keys. If no binding is found, a new binding is created with all included user keys mapping to a new end machine that is selected. For example, session communicating using protocol A may be established for a particular user with an IP Address key. A Diameter session may then be established from a DPI for the same user and IP Address. The multi-protocol stateful router assures that both session initiation messages are routed to the same server so that the different protocol messages can be updated with policy information for providing a session having a consistent policy.

Figure 1:
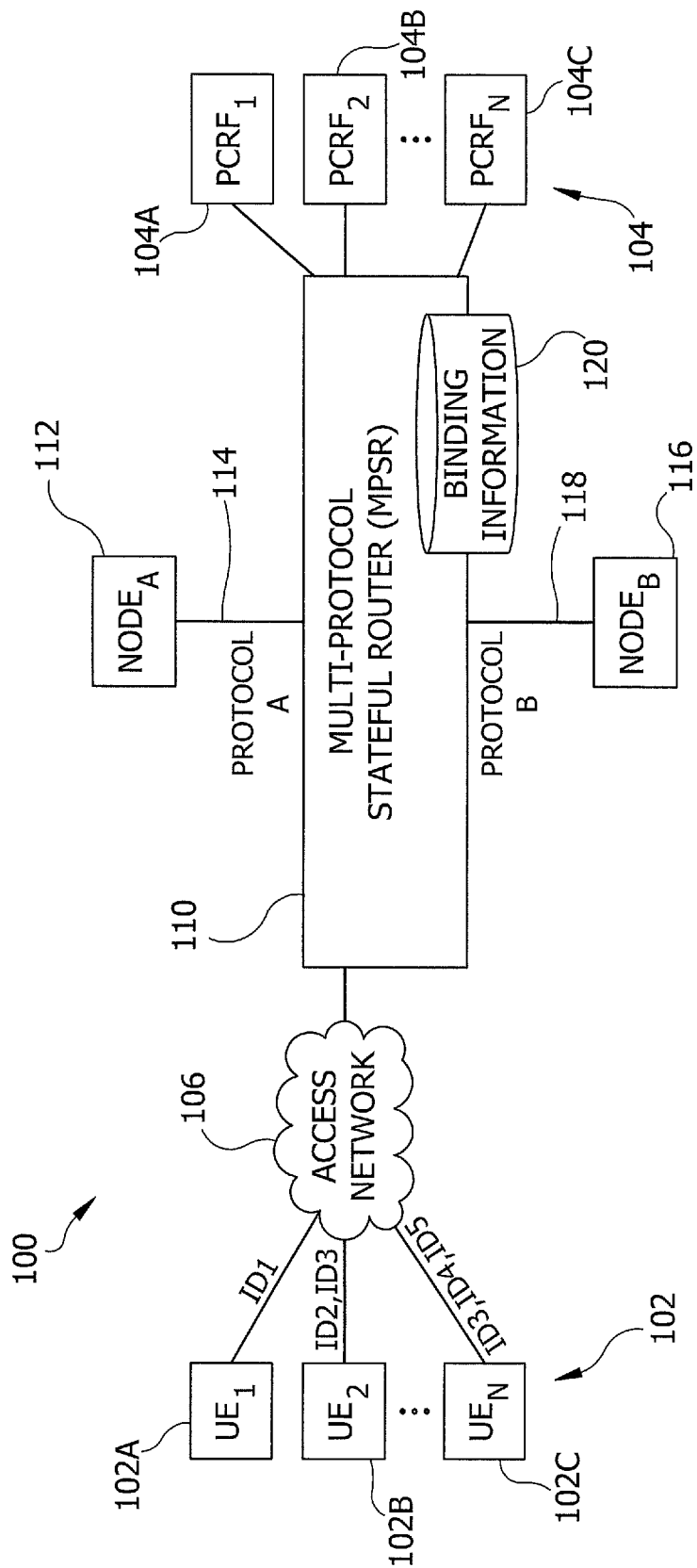
FIG. 1 is a network diagram illustrating multi-protocol stateful routing according to an exemplary implementation of the subject matter described herein.

FIG. 1 is an exemplary network diagram illustrating multi-protocol stateful routing within a network, generally designated 100. In network 100, one or more clients initiate a packet communication session (e.g., voice, data, audio/video streaming, downloading information, an Internet session, or the like) via interacting with any type of User Equipment (UE), generally designated 102. Exemplary UEs 102 include any type of physical or virtual machine that is configured to transmit and/or receive packet communications, not limited to a web-enabled device, a mobile device, a smart device, a phone, a computer, a packet streaming device, a tablet, or the like. In some embodiments, UEs 102 may include a device having a hardware processor and/or a memory that collectively execute or process software for sending and/or receiving packet communications.

Network 100 includes one or more nodes or servers configured to provide support and/or policy charging and information for any given session associated with any given UE 102. In some embodiments, the nodes or servers included a plurality of back-end PCRFs, generally designated 104. PCRFs 104 can be configured within a pool of PCRFs for sharing and/or balancing the implementation of policy and charging functionality within network 100. Once a UE 102 session is assigned to a PCRF, typically all of the traffic associated with that session is routed to the same PCRF until the session is terminated. However, PCRFs 104 may offload traffic to another PCRF, where desired.

An enforcement node residing in an access network 106 may establish a policy session with one of the PCRFs 104 for obtaining policy and charging instructions for client sessions involving one of the UEs 102. Enforcement nodes may include a Deep Packet Inspection (DPI), a gateway, another node, or the like. For example, access network 106 may establish a policy session for any of $UE_1$ to $UE_N$ with any of $PCRF_1$ to $PCRF_N$ (where N is a whole number integer>2). Each UE 102 is associated with one or more unique identifiers (IDs), which may include addresses or identifiers that are associated with a subscriber, a specific UE 102 (e.g., an identifier for the physical device), a phone number, a session identifier, a port address, a connection address, an Internet Protocol (IP) address or the like.

For example, a first device 102A can establish a session with access network 106 by sending packets having a first identifier $ID_1$, a second device 102B can establish a session by sending packets having a second identifier $ID_2$ and a third identifier $ID_3$, and the $N^{th}$ device 102C can establish a session by sending packets having a fourth identifier $ID_4$, a fifth identifier $ID_5$, and/or a sixth identifier $ID_6$. Each UE 102 may be associated with any number (quantity) of identifiers (e.g., IDs) transmitted to access network 106, where the identifiers are used for routing purposes. Notably, packets communicated across different protocols may utilize different identifiers or "keys" that are used for multi-protocol routing as described herein.

Exemplary identifiers, which may be used individually as "keys" or in combination as "composite keys" for looking up information within a routing or binding table, can include an International Mobile Subscriber Identity (IMSI), a Mobile Station International Subscriber Directory Number (MSISDN), an Internet Protocol (IP) address, an International Mobile Equipment Identifier (IMEI), a Mobile Station Roaming Number (MSRN), a user name, a Network Address Identifier (NAI), an Access Point Name (APN), a Media Access Control (MAC) address, a subscriber phone number, a handover number (HON), a port number, an E164 number, or the like. Combinations of two or more identifiers may be collectively used and stored in a binding table as a complex or composite key for routing messages across all protocols or across multiple different protocols to the same server (e.g., PCRF), where possible. In some embodiments, one or more UE identifiers are associated with a policy server identifier in a binding table, once the session is assigned to a policy server, where the policy server identifier identifies a PCRF to which all traffic within a client session is to be routed. The UE identifiers are used to lookup the PCRF for future messages, including messages using all different protocols.

Notably, a multi-protocol stateful router (MPSR) 110 may be deployed within network 100 for receiving and/or intercepting traffic prior to the traffic being received at any one PCRF in a pool of PCRFs 104. A pool of PCRFs 104 may include at least a first PCRF 104A and a second PCRF 104B, etc. In some embodiments, a third PCRF 104C may be provided. More than three PCRFs may also be provided. As used herein, the term "traffic" refers to any and/or all network packet communications or messages, including network messages for one or more sessions within a network.

In some embodiments, MPSR 110 is configured to receive messages sent across any and all protocols and/or any and all interfaces prior to receipt at any PCRF in the pool of PCRFs 104, not limited to messages communicated using protocols including Diameter, remote authentication dial-in user service (RADIUS), Mobile Application Protocol (MAP), HyperText Transfer Protocol (HTTP), HyperText Transfer Protocol Secure (HTTPS), eXtensible Markup Language (XML), Session Initiation Protocol (SIP), Internet Protocol (IP), or the like.

In some embodiments, MPSR 110 is a routing agent configured to receive and route messages from any node within a network, for example, messages from access network 106, messages from at least one node, Node$_A$ 112 via at least one interface 114 communicated via a first protocol A, and message from at least one other node, 116 via at least one other interface 118 communicated via protocol B. First and second nodes (e.g., 112 and 116) may include any suitable component, for example, a gateway, a router, a switch, a server, a DPI, a Broadband Network Gateway (BNG), an application function (AF), etc. In some embodiments, nodes (e.g., 112 and 116) include any node within a core network. Notably, MPSR 110 is configured to receive messages across all (different) protocols (e.g., generally designated protocol A, protocol B, etc.), obtain identification information from the messages communicated across different protocols, update a routing or binding table with the obtained information, route messages from the different protocols to a same PCRF for a same user, a same client, and/or for a same session. MPSR 110 is also configured to store and/or remember the routing information (e.g., the association between the client identifier and the policy server identifier) for future use.

In some embodiments, MPSR 110 has access to a local or remote storage element (see e.g., FIG. 6) that contains binding information 120. For illustration purposes, binding information 120 is illustrated as being stored locally at MPSR 110; however, binding information 120 may be stored remote from MPSR 110 for retrieval at any time. Binding information 120 includes data or information used to route multi-protocol messages for a given client and/or session to a same PCRF. In some embodiments, binding information includes one or more unique identifiers (e.g., ID1, ID2, etc.) associated with a client (e.g., any one of UEs 102) and one or more policy server identifiers associated with a serving (assigned) PCRF. Where a session has not yet been assigned to a PCRF, MPSR 110 is configured to assign the session to a PCRF and store information regarding the assigned session for future use.

Still referring to FIG. 1 and in some embodiments, binding information 120 may be stored within a hardware memory storage element or a hardware storage device, and may include a table, a database, a cache, or the like. In some aspects, binding information 120 includes information stored in a binding table having one or more entries. Each entry includes at least one client identifier (e.g., a subscriber or a session identifier) as well as destination information including at least one server identifier. MPSR 110 is configured to receive multi-protocol message traffic and use a unique identifier obtained (e.g., extracted) from the multi-protocol messages to look up a PCRF 104 that is assigned to handle the traffic for an assigned session. For new sessions that are unassigned, MPSR 110 is configured to assign each session to a given PCRF 104 in accordance with a prioritized list, a load-balancing calculation, or any other suitable assignment methodology.

Table 1 is an exemplary embodiment of binding information 120 that may be stored in a routing or binding table. In some embodiments, binding information 120 includes a plurality of multi-protocol binding records comprising one or more multi-protocol client identifiers and a PCRF identifier. In some aspects, Table 1 is a multi-protocol binding table created from a plurality of multi-protocol binding records, where each of the plurality of multi-protocol binding records comprises a user equipment identifier (e.g., "USER/CLIENT ID(S)) and a PCRF Identifier (e.g., "SERVER ID" that is assigned to the user equipment identifier).

TABLE 1

| ENTRY NUMBER | USER/CLIENT ID(S) | SERVER ID |
|---|---|---|
| 0 | IMSI: 310150123456789<br>IP: 2661:433:0:1:0:0:0:0<br>IP: 10.203.77.125 | PCRF$_1$ |
| 1 | IP: 12.345.678.09 | PCRF$_2$ |
| 2 | MSISDN: 7307406945<br>NAI = 6234150999999999@nai.epc.mnc015.mcc234.3gpp network.org | PCRF$_N$ |
| 3 | MSISDN: 1234567890 | PCRF$_1$ |
| 4 | MSRN: 86139025553<br>IP: 12.345.678.10 | PCRF$_2$ |
| 5 | AppId: 16777238 | PCRF$_N$ |

As illustrated in Table 1 above, each message received at MPSR 110 may be associated with one or more user or client IDs. The user IDs are keys that are used to look up the server (e.g., PCRF) that is assigned to a given client session. User IDs include keys that are indexed or associated with a serving PCRF and stored as binding information 120 in a binding (routing) table, a database, etc. If a session is offloaded or the session is assigned to another PCRF, MPSR 110 is configured to inspect messages exchanged between the client and PCRF for origination and destination information and update the table with the updated binding. In some embodiments, messages routed across different protocols utilize multiple, different identifiers. Thus, multiple identifiers may be used to lookup binding information in the binding table. For example, in entry 0, three user IDs may be associated with a client and the PCRF assigned to the client session. The three user IDs may be used as a composite key to determining routing, where the different IDs are used for different protocols.

Notably, MPSR 110 is configured to receive and/or intercept all messages, even messages from nodes and/or interfaces that communicate across different protocols, and extract and store the client identifiers and policy server identifiers as binding information so that future messages may be correlated to a same server that is assigned to that client and/or client session. MPSR 110 is also configured to assign unassigned messages for sessions it receives to a PCRF according to a prioritized list, capacity, and/or any other assignment methodology. MPSR 110 is configured to store the client identifier and the assigned policy server identifier for use in future routing decisions.

Below is exemplary data that utilized by MPSR 110 for use as binding information 120. The data below may be stored as a record or optionally in a table, such as in Table 1 above. The data below may be stored within any suitable form and any suitable storage element.

```
UserId:
    Entry: IMSI:234150999999999
    Entry: IP:2661:433:0:1:0:0:0:0
    Entry: IP:10.203.77.125
PdnConnectionMapping:
    Entry:
        ServerIdentity: pcrf1.example.com
        PdnConnectionInfo:
```

-continued

```
Entry:
    APN: internetaccess
    IPAddress:
        Entry: 10.203.77.125
    IPv6Prefix:
        Entry: 2661:433:0:1:0:0:0:0
    SessionInfo:
        Entry:
            SessionId:
                10.148.234.56:FFE3260044AEEDA3
            Origin: bng_nas_id
            NASIp: 10.148.234.56
            Protocol: RADIUS
        Entry
            SessionId: pgw;1428950356;1
            AppId: 16777238
            Origin: pgw.example.com
            Protocol: Diameter
```

The data above includes several user IDs (client identifiers) that may be associated with a single session. The user IDs may be used to correlate session traffic for routing to a same server (e.g., a PCRF) or a same pool of servers. Notably, session traffic can be communicated across multiple, different protocols that utilize different keys (e.g., User IDs or identifiers). MPSR 110 utilizes the user IDs as keys to index, lookup, and/or otherwise determine which server is appropriate for all protocol messages communicated during one session. That is, first and second messages of a client session each include at least one common client identifier, thus providing for more efficient lookup of binding information and PCRF assignments. MPSR 110 is configured to then route all session traffic to the same server until either the session is terminated or the traffic is offloaded to another server.

As the data above illustrates, a policy session origination node may include a Broadband Network Gateway (BNG) node that communicates messages via RADIUS protocol across a RADIUS interface. As the user moves and/or the type of network communication changes, an intervening access node including a Packet Data Network (PDN) Gateway (PGW) communicating messages via Diameter protocol across a Diameter interface will need to access policy and charging information for that session from the same PCRF. Thus, MPSR 110 is configured to utilize the different types of user IDs communicated via messages using different protocols to correlate all session traffic, including the Diameter and RADIUS traffic, to the same server (e.g., PCRF). Thus, MPSR 110 is configured to receive all messages, extract and/or store binding information, determine routing, and route all session traffic to a same PCRF.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity, or separated into multiple entities.

Figure 2:
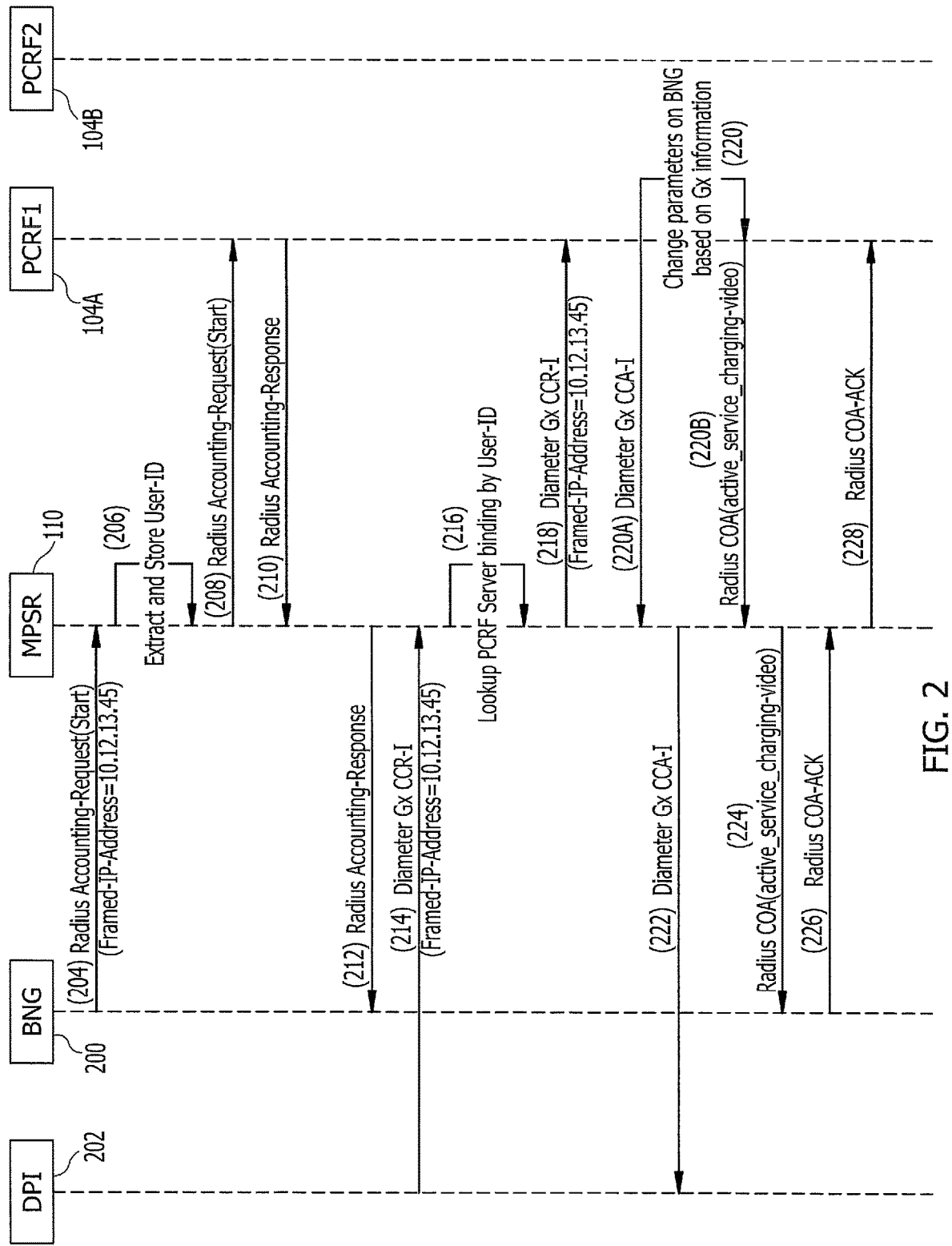
FIGS. 2 to 5 are message flow diagrams illustrating exemplary messaging for multi-protocol stateful routing according to an embodiment of the subject matter described herein.

FIGS. 2 to 5 are message flow diagrams illustrating exemplary messaging for multi-protocol stateful routing according to an embodiment of the subject matter described herein. Referring to FIG. 2, MPSR 110 is configured to receive or intercept all messages (traffic) prior to the messages being routed to first PCRF 104A and/or second PCRF 104B. MPSR 110 is configured to inspect the messages to determine whether the messages belong to a client session that is already assigned to a PCRF, and then route the messages to the PCRF if so assigned. If the messages belong to a client session that is unassigned, then MPSR 110 may assign the session to a given PCRF, associate the client user ID with a policy server identifier associated with the PCRF, and route all future messages belonging to that session to the same PCRF.

Referring to FIG. 2, an accounting request 204 is sent from a Broadband Network Gateway (BNG) 200 to MPSR 110, which selects a PCRF based on the binding information. The accounting request 204 is communicated using the RADIUS protocol across a RADIUS interface. The message includes a first user ID in the form of an IP address (i.e., 10.12.13.45). The IP address is one form of a client identifier or a user ID, which is extracted from the accounting request 204 and stored within a routing or binding table for routing all future messages within a client session.

At 206, MPSR 110 receives the accounting request, and extracts and stores the user ID (e.g., IP address) as a data record in a database, a table, or the like. MPSR 110 routes the request to first PCRF 104A at 208. First PCRF 104A acknowledges the request and sends a response 210. MPSR 110 routes the response to BNG 200 at 212.

During the same client session associated with a same UE having IP address (e.g., 10.12.13.45), a Deep Packet Inspection (DPI) node communicates a Diameter Credit Control Request (CCR) message 214 using a Diameter interface (e.g., a Gx interface) to the MPSR, which selects the PCRF based on the binding information. Notably, MPSR 110 is configured to receive messages communicated across different protocols for determining and implementing appropriate routing for that session. MPSR 110 advantageously eliminates the need for any additional, extraneous signaling that would otherwise be required to handle the RADIUS and Diameter requests separately for determining routing.

At 216, MPSR 110 is configured to receive the Diameter CCR message and perform a lookup within a binding table for identifying and determining the correct PCRF to which the session is already bound. At 216, MPSR 110 utilizes the user ID (e.g., IP:10.12.13.45) as a key to lookup and determine routing of session traffic. MPSR 110 determines that session traffic for IP:10.12.13.45 is bound to first PCRF 104A, and forwards the Diameter CCR message to first PCRF 104A at 218.

When first PCRF 104A receives the Diameter CCR message, it may determine that policy parameters need to change. Policy parameters may include anything relating to policy and charging, such as Quality of Service (QoS), an amount of bandwidth allocated to the session, a change in an amount being charged for the session, activation of application functionality, or the like. Policy parameters may be changed by passing them down to other nodes in the network, such as policy decision points or enforcement nodes (e.g. in case of Diameter this can be achieved using PCC rules).

At 220, first PCRF 104A implements a policy change for the session. At 220A, first PCRF 104A acknowledges the Diameter CCR message via a Diameter Credit Control Answer (CCA) message. At 220B, first PCRF 104A sends a RADIUS Change of Authorization (CoA) message to BNG 200. The CoA message indicates a change in the attributes of an authentication, authorization, and accounting (AAA) session after it is authenticated.

At 222, MPSR 110 forwards (routes) the Diameter CCA message to DPI 202. At 224, MPSR 110 forwards the RADIUS CoA message to BNG 200. At 226, BNG 200 acknowledges the RADIUS CoA message sent from first PCRF 104A. At 228, MPSR 110 forwards the CoA-ACK to first PCRF 104A.

Figure 3:
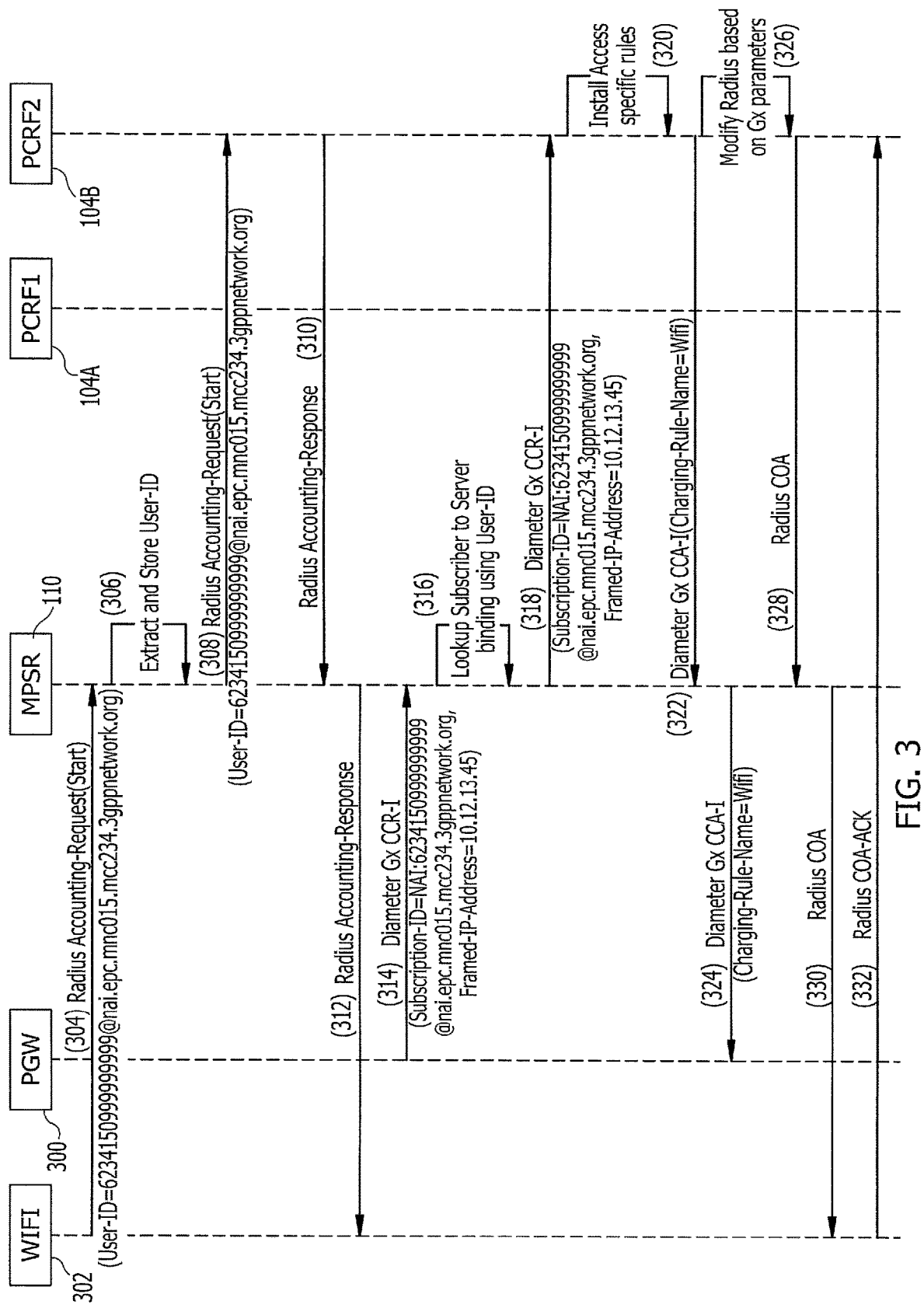

FIG. 3 is a message flow diagram illustrating another embodiment of messaging for multi-protocol stateful routing. As FIG. 3 illustrates, MPSR 110 is configured to receive messages (traffic) prior to the messages being routed to first and second PCRFs 104A and 104B. MPSR 110 can receive or intercept multi-protocol traffic, for example, from a PDN Gateway (PGW) 300 communicating using Diameter and a Diameter interface (e.g., Gx interface) and a trusted, non-3GPP access node, such as a WiFi access node 302 communicating using RADIUS and a RADIUS access.

Referring to FIG. 3, WiFi access node 302 may direct a RADIUS accounting request message 304 towards MPSR 110, which selects a PCRF based on the binding information. The message may require processing by one of the PCRFs. RADIUS accounting request message 304 is communicated according to the RADIUS protocol across a RADIUS interface. The message includes a user ID (i.e., 6234150999999999@nai.epc.mnc015.mcc234.3gppnetwork.org), which includes a client identifier associated with a client session. The user ID may include any suitable type of identifier used by the RADIUS protocol such as an IMSI, MSISDN, MSRN, NAI, etc. Any type(s) of user, subscriber, client, device, and/or session identifiers may be provided.

At 306, MPSR 110 receives the RADIUS accounting request message 304, and extracts and stores the user ID. The user ID is a client identifier that becomes associated with a PCRF and stored as binding information in a data record, a database, a table, or the like. MPSR 110 may recognize that this is a new request, and assign the session to second PCRF 104B. At 308, MPSR 110 forwards the request to second PCRF 104B. Second PCRF 104B acknowledges the request and sends a response 310. MPSR 110 forwards the response to BNG 200 at 312. MPSR 110 includes functionality to remember the association between the client identifier and an identifier associated with the second PCRF 104B for future use.

During the same client session associated with the previously stored client identifier (e.g., NAI), PGW 300 sends a Diameter CCR message 314 towards MPSR 110. Notably, MPSR 110 is configured to receive all messages for a given session, including messages communicated across different protocols for determining and implementing appropriate routing for that session.

At 316, MPSR 110 is configured to receive the Diameter CCR message and perform a lookup in a binding table to identify and determine the correct PCRF to which the client session is bound. At 316, MPSR 110 determines the binding using the user ID or session identifier communicated in the Diameter CCR message. MPSR 110 determines that session traffic for the user ID is bound to second PCRF 104B, and forwards the Diameter CCR message to second PCRF 104B at 318.

When second PCRF 104B receives the Diameter CCR message, it may determine that policy parameters need to change and/or that new or specific rules need to be installed at policy decision points. At 320, second PCRF 104B implements a policy change for the session, which may include installation of one or more access specific policy rules.

At 322, second PCRF 104B acknowledges the Diameter CCR message via a Diameter CCA message. At 324, MPSR 110 forwards the Diameter CCA message to PGW 300.

At 326, second PCRF 104B modifies the RADIUS parameters based on the Diameter parameters. At 328, second PCRF 104B sends a RADIUS CoA message to WiFi access node 302. At 330, MPSR 110 forwards the RADIUS CoA message to WiFi access node 302. At 332, WiFi access node 302 acknowledges the RADIUS CoA message from second PCRF 104B.

Figure 4:
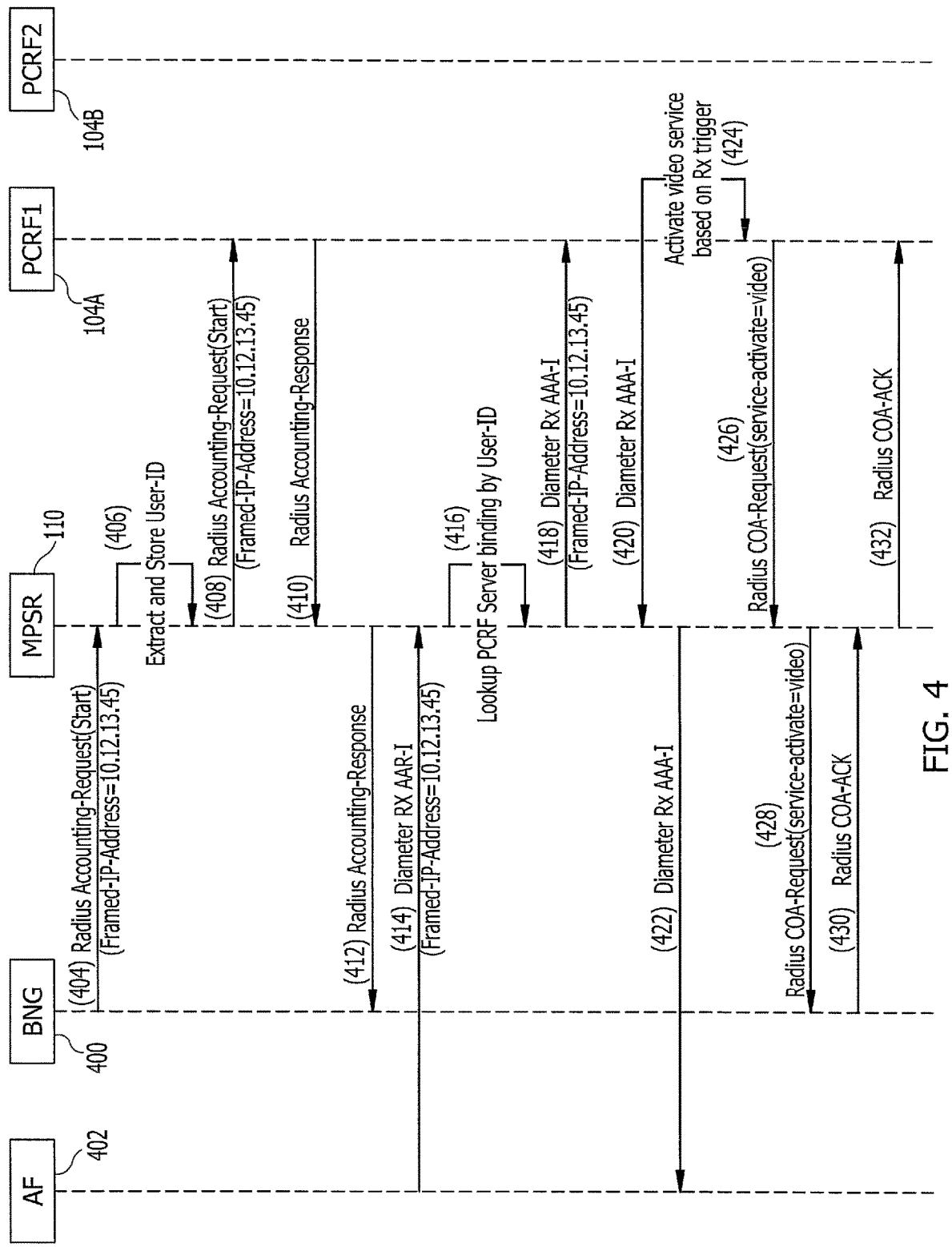

FIG. 4 is a message flow diagram illustrating another embodiment of exemplary messaging for multi-protocol stateful routing. As FIG. 4 illustrates, MPSR 110 is configured to receive traffic prior to receipt at any one of the first and second PCRFs 104A and 104B, respectively. MPSR 110 can receive traffic communicated across multiple different protocols and/or interfaces. For example, MPSR 110 can receive traffic from a BNG 400 and an Application Function (AF) 402, each of which communicate using a different protocol (e.g., Diameter, RADIUS, HTTP, HTTPS, XML, SIP, IP, or the like). In some embodiments, BNG 400 communicates using RADIUS and a RADIUS interface, and AF 402 communicates using Diameter and a Diameter interface (e.g., an Rx interface).

Still referring to FIG. 4, BNG sends a RADIUS accounting request message 404 MPSR 110, which selects the PCRF based on the binding information. RADIUS accounting request message 404 is communicated according to the RADIUS protocol across a RADIUS interface. The message includes a user ID (i.e., IP address 10.12.13.45) that is extracted, stored, and associated with a PCRF for use in future routing via a future lookup.

At 406, MPSR 110 receives the request, and extracts and stores the user ID. The extracted user ID is associated with a policy identifier for an assigned PCRF and stored as binding information in a data record, in a database, a table, or the like. MPSR 110 may recognize that this is a new request, and assign the session to first PCRF 104A. The extracted user ID is associated with an identifier (e.g., an address, a location, a node, etc.) of first PCRF 104A and stored as binding information. At 408, MPSR 110 forwards the request to first PCRF 104A. First PCRF 104A acknowledges the request and sends a RADIUS accounting response 410. MPSR 110 forwards the response to BNG 200 at 412.

As part of the same client session associated with the previously stored User ID, AF 402 sends a RADIUS AAR message 414 to MPSR 110, which selects a PCRF based on the binding information. Notably, MPSR 110 is configured to receive all messages for a given session, including messages communicated across different protocols for determining and implementing appropriate routing for that session.

At 416, MPSR 110 is configured to receive the RADIUS AAR message and perform a lookup to identify and determine the correct PCRF to which the session is already assigned or bound. At 416, MPSR 110 determines the binding using the user ID communicated in the Diameter AAA message as a key to lookup the appropriate server information that was previously stored. MPSR 110 determines that session traffic for the user ID IP: 10.12.13.45 is bound to first PCRF 104A, and forwards the Diameter AAA message to first PCRF 104A at 418. First PCRF 104A receives the Diameter AAA message and acknowledges receipt at 420. At 422, MPSR 110 forwards the acknowledgement to AF 402.

At 424, first PCRF 104A activates a video service based upon the request from AF 402 (e.g., via an Rx interface trigger). At 426, first PCRF 104A sends a RADIUS CoA to BNG 400 based upon the policy change in allowing a video service. At 428, MPSR 110 forwards the RADIUS CoA message to BNG 400. At 430, BNG 400 acknowledges the RADIUS CoA message from first PCRF 104A. At 432, MPSR 110 forwards the acknowledgement (ACK) message to first PCRF 104A.

Figure 5:
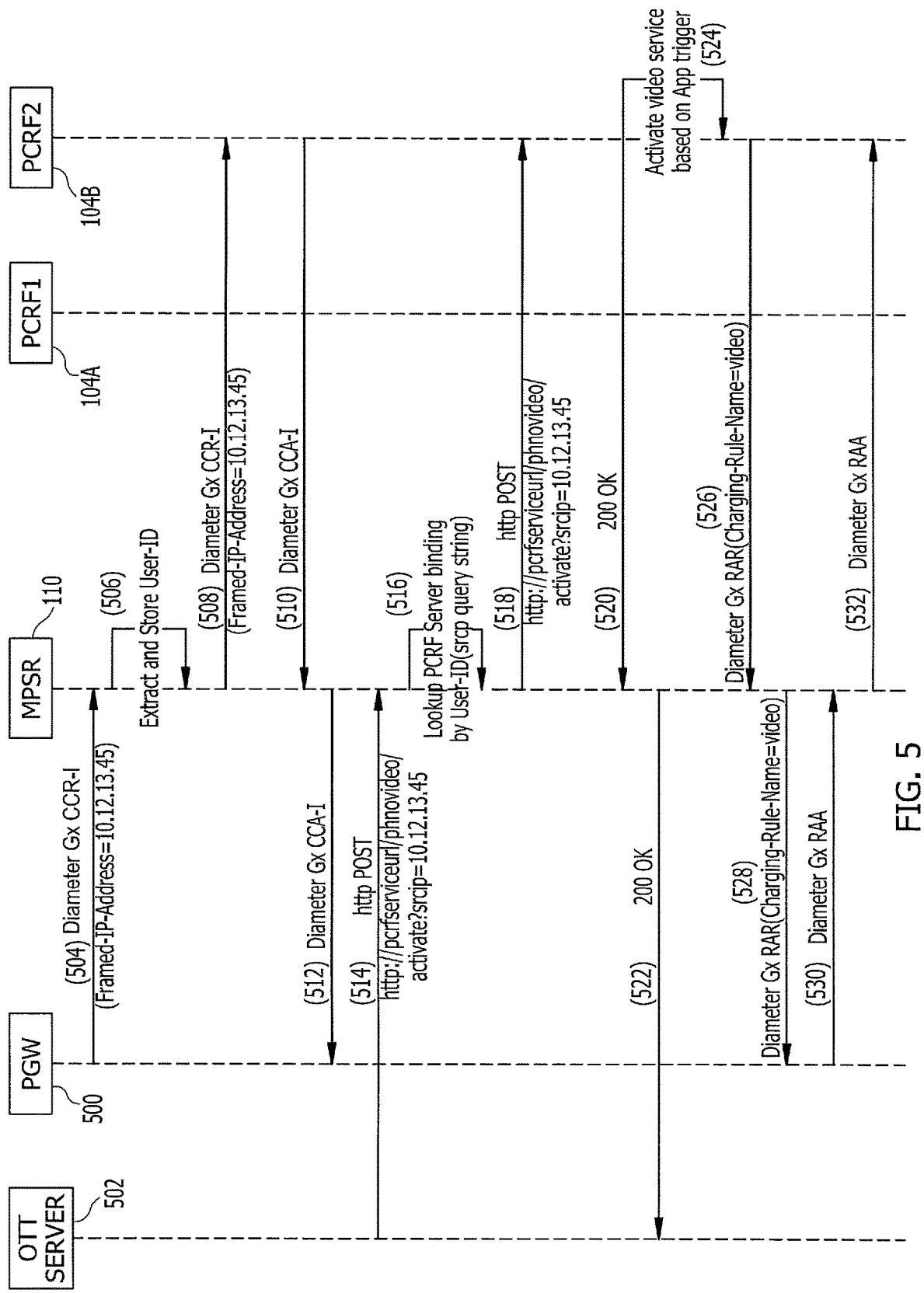

FIG. 5 is a message flow diagram illustrating exemplary messaging for multi-protocol stateful routing according to a further embodiment of the subject matter described herein. As FIG. 5 illustrates, MPSR 110 is configured to receive session traffic prior to the messages being routed to first PCRF 104A and/or second PCRF 104B. MPSR 110 can receive multi-protocol traffic, for example, from a PGW 500 and an Over The Top (OTT) server 502, each of which may communicate using a different communication protocol. In some embodiments, PGW 500 communicates using Diameter and a Diameter interface (e.g., Gx interface), and OTT server 502 communicates using HTTP.

Referring to FIG. 5, a Diameter CCR message 504 is sent from PGW 500 towards MPSR 110. Diameter CCR message 504 is communicated using the Diameter protocol across a Diameter interface. The message includes a first user ID in the form of an IP address (i.e., 10.12.13.45).

At 506, MPSR 110 receives the message, and extracts and stores the user ID with at least one policy server identifier as a data record, in a database, a table, or the like. MPSR 110 stores user ID and a PCRF identifier for the PCRF that is assigned to the client session. Thus, the user ID is associated with a PCRF and stored as binding information. MPSR 110 routes the request to second PCRF 104B at 508. Second PCRF 104B acknowledges the CCR and responds by sending a CCA 510. MPSR 110 routes the CCA to PGW 500 at 512.

During the same client session associated with a same UE having IP address (e.g., 10.12.13.45), OTT server 502 sends and HTTP POST message 514 requiring processing by a policy and charging information associated with streaming or downloading data (e.g., audio data, video data, etc.) during the client session. Notably, MPSR 110 is configured to receive different protocol messages for the user, including messages communicated across multiple different protocols for determining and implementing appropriate routing for that session. MPSR 110 is configured to eliminate the additional, extraneous signaling that would otherwise be required to separately process and/or handle the Diameter and HTTP policy and charging requests.

At 516, MPSR 110 receives the HTTP POST message and performs a lookup to identifying and determining the correct PCRF to which the session is already bound. MPSR 110 determines that the HTTP POST message is in the same client session as the CCR message, and thus routes the HTTP POST message to the PCRF that is assigned to the client session. At 516, MPSR 110 utilizes the user ID (e.g., IP:10.12.13.45) as a key to lookup and determine routing of session traffic. MPSR 110 determines that session traffic for IP:10.12.13.45 is bound to second PCRF 104B, and forwards HTTP POST message to second PCRF 104B at 518. Second PCRF 104B acknowledges the HTTP POST message by sending a 200 OK acknowledgment messages at 520 and 522.

When second PCRF 104B receives the HTTP POST message, it may determine that additional policy services need invoked and/or activated. At line 524, second PCRF 104B activates and/or authorizes a video service based upon the trigger communicated via the HTTP POST message from OTT server 502.

At 526, second PCRF 104B sends a Diameter Re-Auth-Request (RAR) message with the new charging rule. At 528, MPSR 110 forwards the Diameter RAR message to PGW 500. At 530, PGW 500 acknowledges the Diameter RAR message by sending a Re-Auth-Answer (RAA) message. At 532, MPSR 110 forwards the RAA message to second PCRF 104B.

It will be appreciated that FIGS. 2 to 5 are for illustrative purposes and that various other types of nodes and/or messaging may be provided within a network for providing multi-protocol stateful routing. Any other types of nodes and/or messaging, other than that shown, may be provided. Nodes communicating using any protocol may be provided, wherein the messages are received or intercepted and inspected for providing stateful routing prior to reaching a PCRF.

Figure 6:
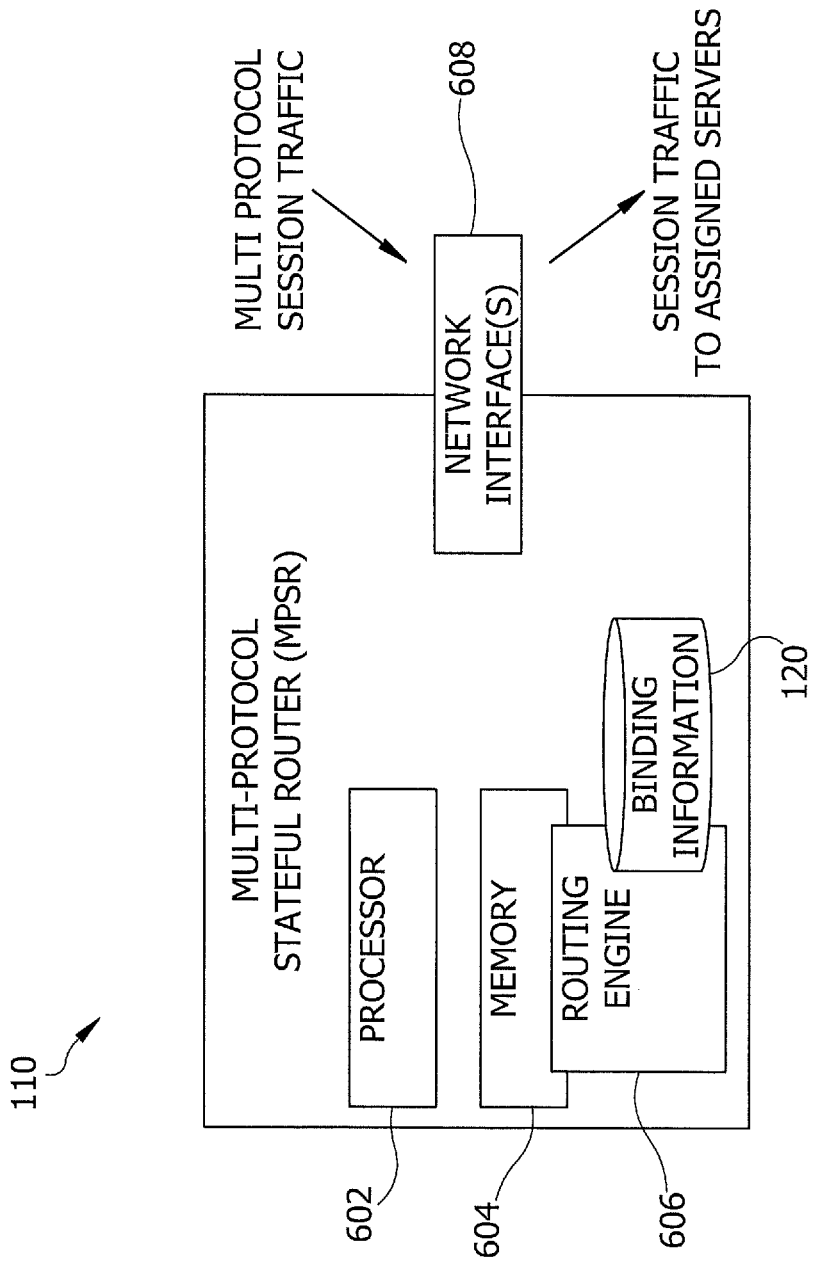
FIG. 6 is a block diagram of a special purpose computer system suitable for use in performing the functions described herein.

FIG. 6 is a block diagram illustrating exemplary components of a special purpose computer system suitable for use in performing the functions described herein, namely multi-protocol stateful routing via MPSR 110 is a special computer system configured for multi-protocol stateful routing. In FIG. 6, MPSR 110 includes at least one processor 602, at least one memory 604, and a network interface 608. Processor 602 may be a physical hardware processor including a single core or multiple cores. Processor 602 may also be a virtual processor that runs on a hypervisor layer that control access to underlying processor hardware.

Memory 604 may be volatile or non-volatile memory that stores instructions executed by processor 602. As with processor 602, memory 604 may be a physical memory chip or virtualized memory that is mapped to one or more physical memory chips by a hypervisor layer. Network interface 608 may be a physical or virtual interface for sending packets to and receiving packets from a network, within a network, and/or between network elements. In some embodiments, interface 608 is configured to receive messages communicated across all protocols. In other embodiments, multiple interfaces 608 are provided, where each interface is dedicated to receiving messages communicated across a single protocol.

In the illustrated example, memory 604 stores a routing engine 606 and binding information 120 accessed by routing engine 606 for multi-protocol stateful routing. Routing engine 606 receives all protocol messages (e.g., Diameter, RADIUS, HTTP, HTTPS, XML, SIP, IP, etc.) and, performs a lookup in binding information 120 (e.g., a table, a data record, a cache, a database, etc.) to determine whether traffic corresponds to a session for which a server has already been assigned. If a server has already been assigned to a given session, routing engine 606 routes the traffic to the corresponding server. For the traffic for which a session has not been assigned to a server (i.e., new session traffic), routing engine 606 assigns the traffic to a new PCRF and stores binding information (i.e., a policy server identifier and one or more client identifiers) so that future traffic is routed to the same PCRF to which the new session traffic was assigned.

Routing engine 606 receives multi-protocol message traffic and identifies traffic belonging to a common client session. Routing engine 606 also determines whether the traffic for a given client session has been assigned to a PCRF (e.g., 104A, 104B, and 104C, FIG. 1). If traffic for a client session has been assigned, routing engine 606 routes the different protocol messages to the PCRF to which the client session has been assigned based on the stored binding information. Routing engine 606 is configured to identify traffic for which sessions have not been assigned to a PCRF (e.g., 104A, 104B, and 104C, FIG. 1). For such traffic, routing engine 606 assigns the sessions to a PCRF and routes the traffic to the assigned PCRF. Routing engine stores the binding information (e.g., one or more client identifiers and a policy server identifier) as binding information 120 for future routing. Should the routing to a given PCRF change at all during a given session, MPSR 110 is configured to extract and update binding information 120.

It is understood that the architecture illustrated in FIG. 6 is simplified in that a MPSR 110 may include additional or alternative components without departing from the scope of the subject matter described herein. In one example, MPSR 110 may be implemented on a processor blade in a rack-mounted system. Multiple MPSR 110 processor blades may plug into a backplane to form a shelf. The MPSR 110 processor blades may themselves operate in a stateful and redundant manner. In addition, MPSR 110 may be a virtual MPSR that runs on a hypervisor layer that shares access to underlying hardware, such as processor, memory, and network interfaces.

It will be appreciated that FIG. 6 is for illustrative purposes and that various components, their locations, and/or their functions described above in relation to FIG. 6 may be changed, altered, added, and/or removed.

Figure 7:
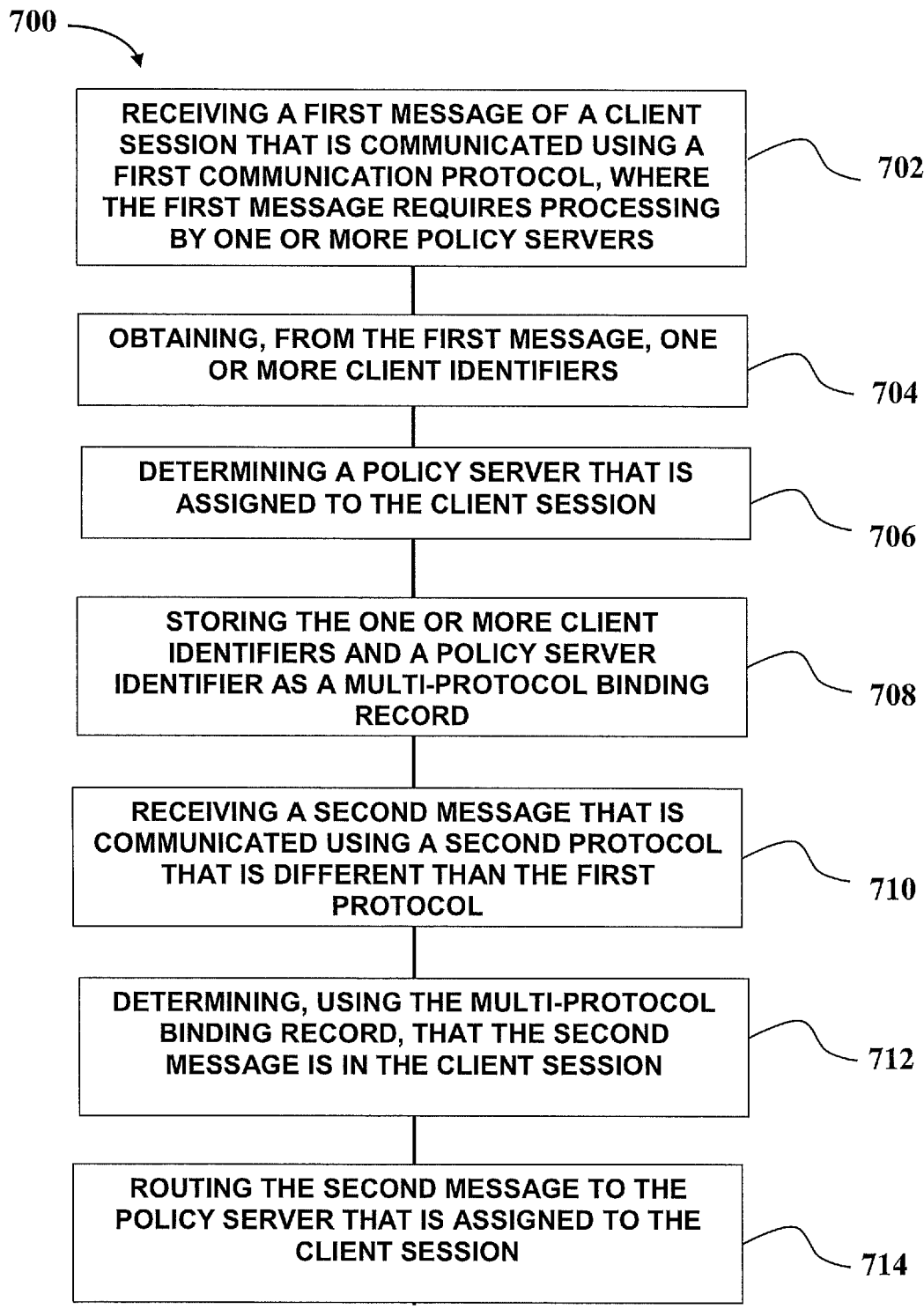
FIG. 7 is a flow chart illustrating an exemplary process for multi-protocol stateful routing according to an exemplary implementation of the subject matter described herein.

FIG. 7 is a flow chart illustrating an exemplary process, generally designated 700, for multi-protocol stateful routing according to an exemplary implementation of the subject matter described herein. Multi-protocol stateful routing may be performed at a multi-protocol stateful router including at least one processor, such as MPSR 110 (e.g., FIGS. 1 to 6).

In block 702, the MPSR (e.g., 110, FIGS. 1 to 6) receives a first message of a client session that is communicated using a first communication protocol. The first message requires processing by one or more PCRFs. For example, the message may include an accounting request, a charging request, an AAA request, a trigger for effecting a change in a policy session, or the like.

In block 704, the MPSR obtains, from the first message, one or more first client identifiers. Client identifiers may be obtained via extraction and stored, along with a policy identifier as binding information. Client identifiers may include an IMSI, a MSISDN, an IP address, an IMEI, a MSRN, a user name, a NAI, an APN, a MAC address, a subscriber phone number, a HON, a port number, or the like.

In block 706, MPSR determines a policy server (PCRF) that is assigned to the client session. MPSR may determine a policy server via performing a lookup in a binding table or binding record. If the client session is a new session, MPSR may assign a policy server and store identifiers associated with the newly assigned session as binding information and/or as a binding record.

In block 708, MPSR stores the one or more client identifiers and a policy server identifier, which is associated with the policy server that is assigned to the client session as a multi-protocol binding record.

In block 710, MPSR receives a second message that is communicated using a second protocol that is different from the first protocol. The second message also requires processing by the one or more policy servers. The second message includes one or more second client identifiers. At least one of the first client identifiers and at least one of the second client identifiers may include a same, common identifier.

In block 712, MPSR determines, using the multi-protocol binding record that the second message is in the same client session as the first message.

In block 714, MPSR routes the second message to the policy server that is assigned to the client session.

Multi-protocol stateful routing as described herein functions on special purpose computing platforms, such as MPSR and PCRFs. The routing functionality and binding information described herein improve the functionality of messaging and server allocation and/or policy server utilization within a network, as routing and processing packets between network components (e.g., MPSR, PCRFs, gateways) and the core network in general is more intelligent, simplified, and less costly as the need to retrieving a user profile from various locations is eliminated. Multi-protocol stateful routing as described herein improves the technological field of server assignment for policy and charging control and stateful routing. By receiving user information from many sources and across multiple, different protocols, server utilization efficiency is also increased.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing multi-protocol stateful routing, the method comprising:

at a multi-protocol stateful router including at least one processor:

receiving a first message from a first user device of a client session that is communicated using a first communication protocol, wherein the first message requires processing by one or more policy servers, wherein the client session is a remote authentication dial in user service (RADIUS) session, the first communication protocol is RADIUS, and the first message is a RADIUS message;

obtaining, from the first message, a first client identifier;

determining that the client session is assigned to a first policy server from a pool of different policy servers and routing, in response to determining that the client session is assigned to the first policy server, the first message to the first policy server, wherein the first policy server is a multi-protocol policy and charging rules function (PCRF);

storing the first client identifier and a first policy server identifier that is associated with the first policy server as a multi-protocol binding record;

receiving a second message from a second user device that is communicated using a second protocol that is different from the first protocol, wherein the second message belongs to a Diameter session, the second protocol is Diameter, and the second message is a Diameter message;

determining, using the multi-protocol binding record, that the second message is assigned to the first policy server by determining that the second message includes the first client identifier and looking up the first policy server identifier in the multi-protocol binding record using the first client identifier;

determining that the second message includes a second client identifier in addition to the first identifier and adding the second client identifier to the multi-protocol binding record;

routing, in response to determining that the second message from the second user device is assigned to the first policy server, the Diameter message to the multi-protocol PCRF, causing the multi-protocol PCRF to change one or more policy parameters for the RADIUS session with the first user device in response to the Diameter message from the second user device; and receiving, in response to the Diameter message, a RADIUS response message specifying the one or more policy parameters from the multi-protocol PCRF and routing the RADIUS response message to the RADIUS session using the multi-protocol binding record.

2. The method of claim 1, wherein at least one of the first and second client identifiers comprises an International Mobile Subscriber Identity (IMSI), a Mobile Station International Subscriber Directory Number (MSISDN), an Internet Protocol (IP) address, an International Mobile Equipment Identifier (IMEI), a Mobile Station Roaming Number (MSRN), a user name, a Network Address Identifier (NAI), an Access Point Name (APN), a Media Access Control (MAC) address, a subscriber phone number, a handover number (HON), or a port number.

3. The method of claim 1, further comprising creating a multi-protocol binding table from a plurality of multi-protocol binding records, wherein each of the plurality of multi-protocol binding records comprises a user equipment identifier and a policy server identifier that is assigned to the user equipment identifier.

4. The method of claim 3, further comprising receiving session traffic associated with a second client session and routing the session traffic that is associated with the second client session to a second policy server using the multi-protocol binding table.

5. The method of claim 1, comprising receiving a third message and determining that the third message is assigned to the first policy server by determining that the third message includes the second client identifier and looking up the first policy server identifier in the multi-protocol binding record using the second client identifier.

6. The method of claim 1, wherein the first message is received from a gateway, a router, a switch, a server, an access point, an access node, a Deep Packet Inspection (DPI) node, a Broadband Network Gateway (BNG), an application function (AF), an Over The Top (OTT) server, a PDN Gateway (PGW), or any non-3GPP access node.

7. A system for multi-protocol routing, the system comprising:
   a multi-protocol stateful router including at least one processor;
   at least one network interface configured to receive a first message from a first user device of a client session that is communicated using a first communication protocol, wherein the first message requires processing by one or more policy servers, and wherein a first client identifier is obtained from the first message, wherein the client session is a remote authentication dial in user service (RADIUS) session, the first communication protocol is RADIUS, and the first message is a RADIUS message; and
   a memory element having binding information stored therein for determining a first policy server from a pool of policy servers that is assigned to the client session, wherein the first client identifier and a first policy server identifier that is associated with the first policy server are stored within the memory element as a multi-protocol binding record, wherein the first policy server is a multi-protocol policy and charging rules function (PCRF); and
   wherein the multi-protocol stateful router is configured to route the first message to the first policy server in response to determining that the first policy server is assigned to the client session and to receive a second message from a second user device that is communicated using a second protocol that is different from the first protocol, wherein the second message belongs to a Diameter session, the second protocol is Diameter, and the second message is a Diameter message, and
   wherein the multi-protocol stateful router is configured to determine, using the multi-protocol binding record, that the second message is assigned to the first policy server by determining that the second message includes the first client identifier and looking up the first policy server identifier in the multi-protocol binding record using the first client identifier, and
   wherein the multi-protocol stateful router is configured to determine that the second message includes a second client identifier in addition to the first identifier and add the second client identifier to the multi-protocol binding record and to route, in response to determining that the second message from the second user device is assigned to the first policy server, the Diameter message to the multi-protocol PCRF, causing the multi-protocol PCRF to change one or more policy parameters for the RADIUS session with the first user device in response to the Diameter message from the second user device, and to receive, in response to the Diameter message, a RADIUS response message specifying the one or more policy parameters from the multi-protocol PCRF and route the RADIUS response message to the RADIUS session using the multi-protocol binding record.

8. The system of claim 7, wherein at least one of the first and second client identifiers comprises an International Mobile Subscriber Identity (IMSI), a Mobile Station International Subscriber Directory Number (MSISDN), an Internet Protocol (IP) address, an International Mobile Equipment Identifier (IMEI), a Mobile Station Roaming Number (MSRN), a user name, a Network Address Identifier (NAI), an Access Point Name (APN), a Media Access Control (MAC) address, a subscriber phone number, a handover number (HON), or a port number.

9. The system of claim 7, further comprising a multi-protocol binding table stored within the memory element, wherein the multi-protocol binding table comprises a plurality of multi-protocol binding records, and wherein each of the plurality of multi-protocol binding records comprises at least one client identifier and at least one policy server identifier that is assigned to the at least one client identifier.

10. The system of claim 9, wherein the multi-protocol stateful router receives session traffic associated with a second client session, and routes the traffic associated with the second client session to a second policy server using the multi-protocol binding table.

11. The system of claim 7, wherein the multi-protocol stateful router is configured for receiving a third message and determining that the third message is assigned to the first policy server by determining that the third message includes the second client identifier and looking up the first policy server identifier in the multi-protocol binding record using the second client identifier.

12. The system of claim 7, wherein the first message is received from a gateway, a router, a switch, a server, an access point, an access node, a Deep Packet Inspection (DPI) node, a Broadband Network Gateway (BNG), an application function (AF), an Over The Top (OTT) server, a PDN Gateway (PGW), or any non-3GPP access node.

13. A non-transitory computer readable medium having stored thereon executable instructions that when executed by a processor of a computer controls the computer to perform steps comprising:
   receiving a first message from a first user device of a client session that is communicated using a first communication protocol, wherein the first message requires processing by one or more policy servers, wherein the client session is a remote authentication dial in user service (RADIUS) session, the first communication protocol is RADIUS, and the first message is a RADIUS message;

obtaining, from the first message, a first client identifier;
determining that the client session is assigned to a first policy server from a pool of different policy servers and routing, in response to determining that the client session is assigned to the first policy server, the first message to the first policy server, wherein the first policy server is a multi-protocol policy and charging rules function (PCRF);
storing the first client identifier and a first policy server identifier that is associated with the first policy server as a multi-protocol binding record;
receiving a second message from a second user device that is communicated using a second protocol that is different from the first protocol, wherein the second message belongs to a Diameter session, the second protocol is Diameter, and the second message is a Diameter message;
determining, using the multi-protocol binding record, that the second message is assigned to the first policy server by determining that the second message includes the first client identifier and looking up the first policy server identifier in the multi-protocol binding record using the first client identifier;
determining that the second message includes a second client identifier in addition to the first identifier and adding the second client identifier to the multi-protocol binding record;
routing, in response to determining that the second message from the second user device is assigned to the first policy server, the Diameter message to the multi-protocol PCRF, causing the multi-protocol PCRF to change one or more policy parameters for the RADIUS session with the first user device in response to the Diameter message from the second user device; and
receiving, in response to the Diameter message, a RADIUS response message specifying the one or more policy parameters from the multi-protocol PCRF and routing the RADIUS response message to the RADIUS session using the multi-protocol binding record.

* * * * *